US012587361B2

(12) United States Patent
Hoshizuki et al.

(10) Patent No.: US 12,587,361 B2
(45) Date of Patent: *Mar. 24, 2026

(54) ENCRYPTION PROCESSING APPARATUS AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 18/670,221

(22) Filed: May 21, 2024

(65) Prior Publication Data

US 2024/0305445 A1 Sep. 12, 2024

Related U.S. Application Data

(63) Continuation of application No. PCT/JP2022/033960, filed on Sep. 9, 2022.

(30) Foreign Application Priority Data

Nov. 26, 2021 (JP) ................................. 2021-192046

(51) Int. Cl.
| | |
|---|---|
| *H04L 29/06* | (2006.01) |
| *H04L 9/00* | (2022.01) |
| *H04L 9/06* | (2006.01) |

(52) U.S. Cl.
CPC ............ *H04L 9/0618* (2013.01); *H04L 9/008* (2013.01)

(58) Field of Classification Search
CPC .............................. H04L 9/0618; H04L 9/008
See application file for complete search history.

(56) References Cited

U.S. PATENT DOCUMENTS

| | | | | |
|---|---|---|---|---|
| 2018/0359079 A1* | 12/2018 | Hu | ............................. | H04L 9/008 |
| 2023/0087864 A1* | 3/2023 | Cheng | ................... | H04L 9/0618 |
| | | | | 380/28 |
| 2024/0267222 A1* | 8/2024 | Chillotti | ................. | H04L 9/008 |

FOREIGN PATENT DOCUMENTS

| | | |
|---|---|---|
| JP | 2017223822 A | 12/2017 |
| JP | 2019517684 A | 6/2019 |
| JP | 202053860 A | 4/2020 |

OTHER PUBLICATIONS

New techniques for Multi-value Input Homomorphic Evaluation and Applications. Cryptology ePrint Archive pp. 1-20 (2019) (part of Applicant's Admitted Prior Art) (hereafter "Carpov"). (Year: 2019).*

(Continued)

*Primary Examiner* — Evans Desrosiers
(74) *Attorney, Agent, or Firm* — Osha Bergman Watanabe & Burton LLP

(57) ABSTRACT

An encryption processing apparatus processing a hully homomorphic ciphertext includes a processor. The processor obtains, based on a subtraction result of homomorphic subtraction of a second ciphertext from a first ciphertext, a binary third ciphertext determining whether the subtraction result is positive or negative. The processor then performs a process that subtracts a result of homomorphic multiplication between the third ciphertext and the second ciphertext from the first ciphertext in a homomorphic manner to obtain a new ciphertext. The processor obtains a new third ciphertext by using a process result of the process as a new first ciphertext, and repeats the process using the new first ciphertext, the second ciphertext, and the new third ciphertext. The processor outputs the new ciphertext obtained after a predetermined number of repetitions of the process in total, as a result of a remainder operation of the first ciphertext by the second ciphertext.

15 Claims, 11 Drawing Sheets

(56)  References Cited

OTHER PUBLICATIONS

I. Chillotti et al. "TFHE: Fast Fully Homomorphic Encryption over the Torus" Journal of Cryptology, 33:34-91 (62 pages).

H. Okada et al. "Integer-Wise Functional Bootstrapping on TFHE: Applications in Secure Integer Arithmetics" MDPI; 2021,12,297, pp. 1-18 (18 pages).

A. Chatterjee et al. "Translating Algorithms to Handle Fully Homomorphic Encrypted Data on Cloud" IEEE Transactions on Cloud Computing, 2018, vol. 6 No. 1, pp. 287-300 (14 pages).

M. Babenko et al. "Euclidean Division Method for the Homomorphic Scheme CKKS" Proceedings of the 2021 IEEE Conference of Russian Young Researchers in Electrical and Electronic Engineering (EIConRus), Jan. 2021, pp. 217-220 (5 pages).

International Search Report issued in International Application No. PCT/JP2022/033960, mailed Nov. 8, 2022 (7 pages).

Written Opinion issued in International Application No. PCT/JP2022/033960; Dated Nov. 8, 2022 (4 pages).

\* cited by examiner

FIG.10

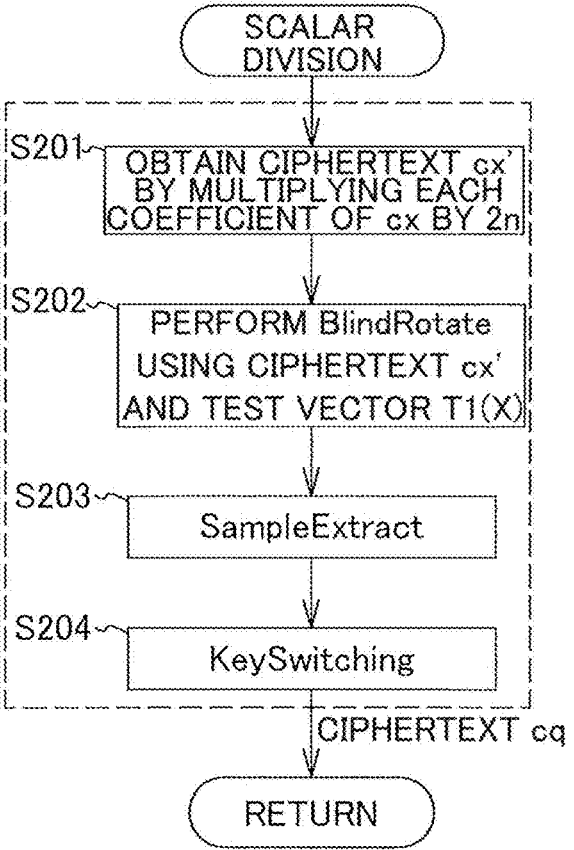

SCALAR DIVISION

S201 OBTAIN CIPHERTEXT cx' BY MULTIPLYING EACH COEFFICIENT OF cx BY 2n

S202 PERFORM BlindRotate USING CIPHERTEXT cx' AND TEST VECTOR T1(X)

S203 SampleExtract

S204 KeySwitching

CIPHERTEXT cq

RETURN

FIG.11

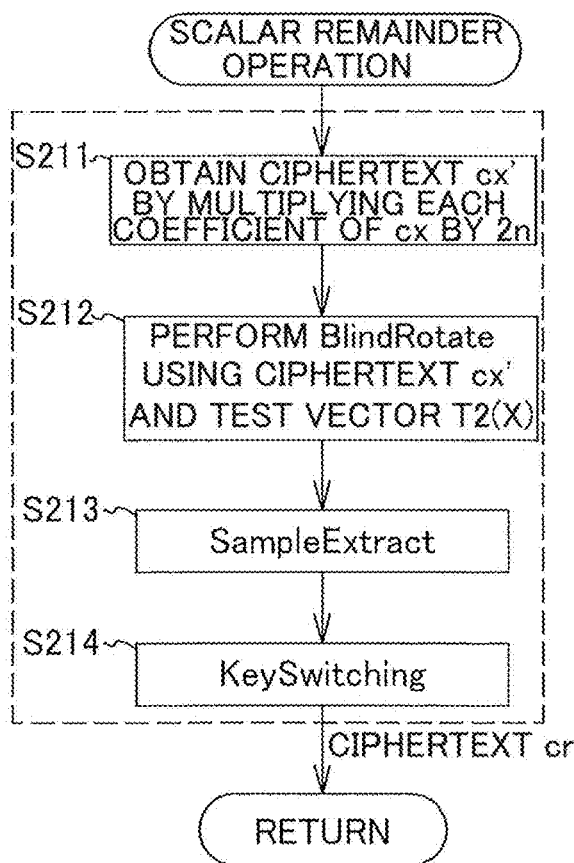

SCALAR REMAINDER OPERATION

S211 OBTAIN CIPHERTEXT cx' BY MULTIPLYING EACH COEFFICIENT OF cx BY 2n

S212 PERFORM BlindRotate USING CIPHERTEXT cx' AND TEST VECTOR T2(X)

S213 SampleExtract

S214 KeySwitching

CIPHERTEXT cr

RETURN

MULTIPLE–PRECISION OPERATION (ADDITION) PROCESS

S301 — $i = 0$

S302 — $cz_i = ca_i + cb_i + ce_{i-1}$

S303 — PERFORM SCALAR DIVISION ON $cz_i$ AS INPUT $ce_i$

S304 — PERFORM SCALAR REMAINDER OPERATION ON $cz_i$ AS INPUT $cm_i$

S305 — $i = u$?

No

S206 — $i = i + 1$

Yes

S307 — OUTPUT STRING OF $cm_i$

RETURN

ENCRYPTION PROCESSING APPARATUS AND ENCRYPTION PROCESSING METHOD

CROSS-REFERENCE TO RELATED APPLICATION

This application is a continuation application of International Application PCT/JP2022/033960 filed on Sep. 9, 2022 and designated the U.S., the entire contents of which are incorporated herein by reference in their entirety.

FIELD

The embodiments discussed herein are related to an encryption processing apparatus, and a non-transitory computer-readable recording medium.

BACKGROUND

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are known an additive homomorphic encryption that performs only an additive operation (addition and subtraction) while a finite cyclic group is regarded as an integer, and multiplicative homomorphic encryption that performs only a multiplicative operation (multiplication) while a finite cyclic group is regarded as an integer.

Since the finite cyclic group can be multiplied by an integer by repeating addition, a plaintext can be multiplied by an integer, and the plaintext can be exponentiated by repeating multiplication.

There is also known fully homomorphic encryption (FHE) that allows both an additive operation and a multiplicative operation to be performed while ciphertexts remain encrypted.

One of known fully homomorphic encryption techniques is fully homomorphic encryption based on the LWE (Learning with Errors) problem, which is configured by adding a small error to a plaintext in an encryption process to such an extent that there is no problem in decryption.

In fully homomorphic encryption based on the LWE problem, an error is accumulated as an operation is performed, and therefore bootstrapping for reducing an error component while the error component remains encrypted is performed before the error becomes too large to be decrypted.

The computation time of bootstrapping occupies most of the computation time included in fully homomorphic encryption. Further, the amount of computation is large in bootstrapping, because bootstrapping handles a large amount of data. Therefore, an operation of fully homomorphic encryption may not be able to obtain the operation result within a practical time.

A method for drastically improving this problem is TFHE (Fast Fully Homomorphic Encryption over the Torus) described in TFHE: Fast Fully Homomorphic Encryption over the Torus. Journal of Cryptology, 33:34-91, 2020, I. Chillotti, N. Gama, M. Georgieva, and M. Izabachene (referred to as "Chillotti et al., 2020" in the following descriptions).

Homomorphic encryption includes Bit-wise type homomorphic encryption having two values as a plaintext and based on a logical operation, and Integer-wise type homomorphic encryption having a whole integer as a plaintext as one ciphertext. TFHE described in Chillotti et al., 2020 is the Bit-wise type.

The plaintext in TFHE is a real number from 0 to 1 associated with a circle group. Therefore, by associating sections obtained by dividing the range from 0 to 1 of the circle group with integers in turn, TFHE can be applied as Integer-wise type homomorphic encryption having an integer as a plaintext. For example, Integerwise Functional Bootstrapping on TFHE, 2020, Hiroki Okada, Shinsaku Kiyomoto, and Carlos Cid can be mentioned (referred to as "Okada et al., 2020" in the following descriptions).

If TFHE can be used as homomorphic encryption that can be subjected to four arithmetic operations in the Integer-wise type instead of the Bit-wise type, more efficient processing can be performed as compared with a bit-by-bit computation.

The aforementioned paper shows that a TLWE ciphertext used in TFHE is an additive homomorphic type for a plaintext on a circle group, and it is obvious that the TLWE ciphertext can be subjected to addition (subtraction).

Meanwhile, multiplication is not obvious because a multiplicative operation is not defined on the circle group. Since the circle group is a Z-module, only integer multiples are defined on the circle group. Therefore, an inverse element of a plaintext can be obtained by multiplication of an inverse element modulo a number divided into sections. However, the inverse element and division are not coincident with each other unless there is a guarantee that an original number is divisible. That is, division with a remainder cannot be performed. Further, division and a remainder operation between ciphertexts are also not proposed.

It is an object of an aspect of the present invention to realize four arithmetic operations on Integer-wise type TFHE more completely.

SUMMARY

According to an aspect of the embodiments, an encryption processing apparatus processes a ciphertext, the ciphertext being a fully homomorphic ciphertext that has, as a plaintext associated with an integer, a value obtained by adding an error with a predetermined variance to a predetermined value and that is able to be subjected to a predetermined operation between integers without being decrypted. The encryption processing apparatus includes a processor that performs the following processes. The processor obtains, based on a subtraction result of homomorphic subtraction of a second ciphertext as a divisor from a first ciphertext as a dividend, a binary third ciphertext determining whether the subtraction result is positive or negative. The processor performs an operation process that subtracts a result of homomorphic multiplication between the third ciphertext and the second ciphertext from the first ciphertext in a homomorphic manner to obtain a new ciphertext. The processor obtains a new third ciphertext by using an operation result of the operation process as a new first ciphertext, and repeats the operation process by using the new first ciphertext, the second ciphertext, and the new third ciphertext. Further, the processor outputs the new ciphertext obtained after a predetermined number of repetitions of the operation process in total, as a result of a remainder operation of the first ciphertext by the second ciphertext.

According to an aspect of the embodiments, it is possible to realize four arithmetic operations on Integer-wise type TFHE more completely.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF DRAWINGS

FIG. 10 is a flowchart illustrating a flow of a scalar division process performed by the encryption processing apparatus;

FIG. 11 is a flowchart illustrating a flow of a scalar remainder operation process performed by the encryption processing apparatus;

DESCRIPTION OF EMBODIMENTS

An embodiment of the present invention is described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value logical operation.

Figure 1:
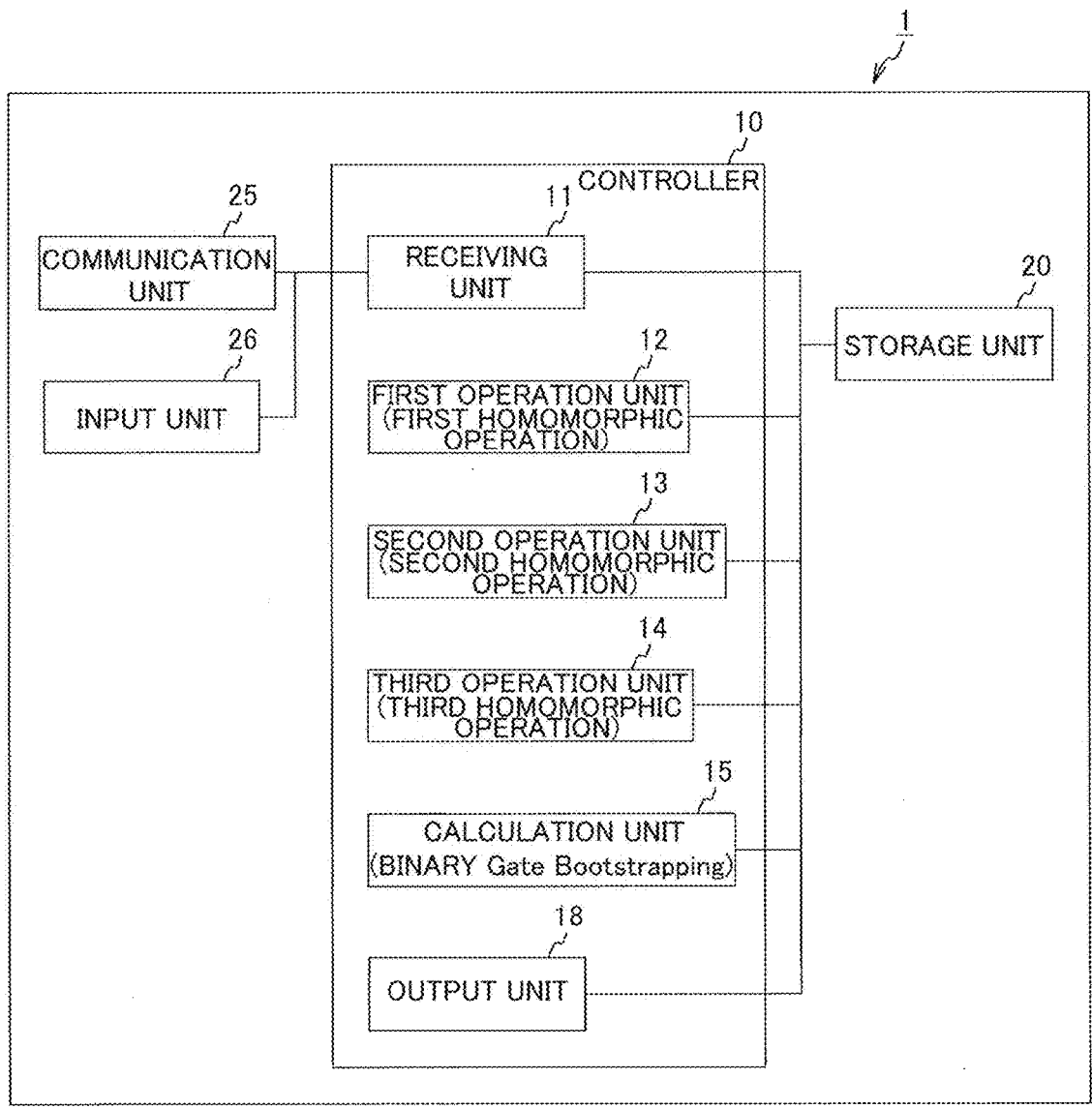
FIG. 1 is an explanatory diagram of a functional configuration of an encryption processing apparatus of the present embodiment.

FIG. 1 is an explanatory diagram of a functional configuration of an encryption processing apparatus of the present embodiment.

An encryption processing apparatus 1 includes a controller 10, a storage unit 20, a communication unit 25, and an input unit 26.

The controller 10 includes a receiving unit 11, a first operation unit 12, a second operation unit 13, a third operation unit 14, a first Bootstrapping unit (calculation unit) 15, and an output unit 18.

The receiving unit 11 receives input of a ciphertext that is an object of an operation, via the communication unit 25 or the input unit 26. Alternatively, the receiving unit 11 receives input of a ciphertext from another process performed by the encryption processing apparatus 1.

The first operation unit 12 performs a first homomorphic operation on an input ciphertext received by the receiving unit 11.

The second operation unit 13 performs a second homomorphic operation on the ciphertext output from the first Bootstrapping unit 15 and an input ciphertext.

The third operation unit 14 performs a third homomorphic operation on the ciphertext output from the first Bootstrapping unit 15.

The first operation unit 12, the second operation unit 13, and the third operation unit 14 are arithmetic processing units that realize homomorphic operations described below by software.

The first Bootstrapping unit 15 performs a Gate Bootstrapping process described below on at least one of the operation results output from the first operation unit 12, the second operation unit 13, and the third operation unit 14.

At least one of the first operation unit 12, the second operation unit 13, the third operation unit 14, and the first Bootstrapping unit 15 may be realized by hardware.

The output unit 18 outputs a final operation result to outside of the encryption processing apparatus 1 or to another processing process performed by the encryption processing apparatus 1.

The storage unit 20 can store therein an input ciphertext, a temporary file and temporary data used in an operation for ciphertexts, and an output ciphertext.

An encrypted encryption database 60 can also be stored in the storage unit 20.

The communication unit 25 connects the encryption processing apparatus 1 to a network, thereby enabling communication between the encryption processing apparatus 1 and an external apparatus to be performed.

The encryption processing apparatus 1 can serve as a database server by storing the encrypted encryption database 60 in the storage unit 20 and including the communication unit 25.

In this case, the encryption processing apparatus 1 can receive an encrypted query from a terminal apparatus as the external apparatus, search the encrypted encryption database 60, and send an encrypted search result to the terminal apparatus.

The input unit 26 inputs a ciphertext that is an object of arithmetic processing and a query for the encrypted database 60, to the encryption processing apparatus 1.

Figure 2:
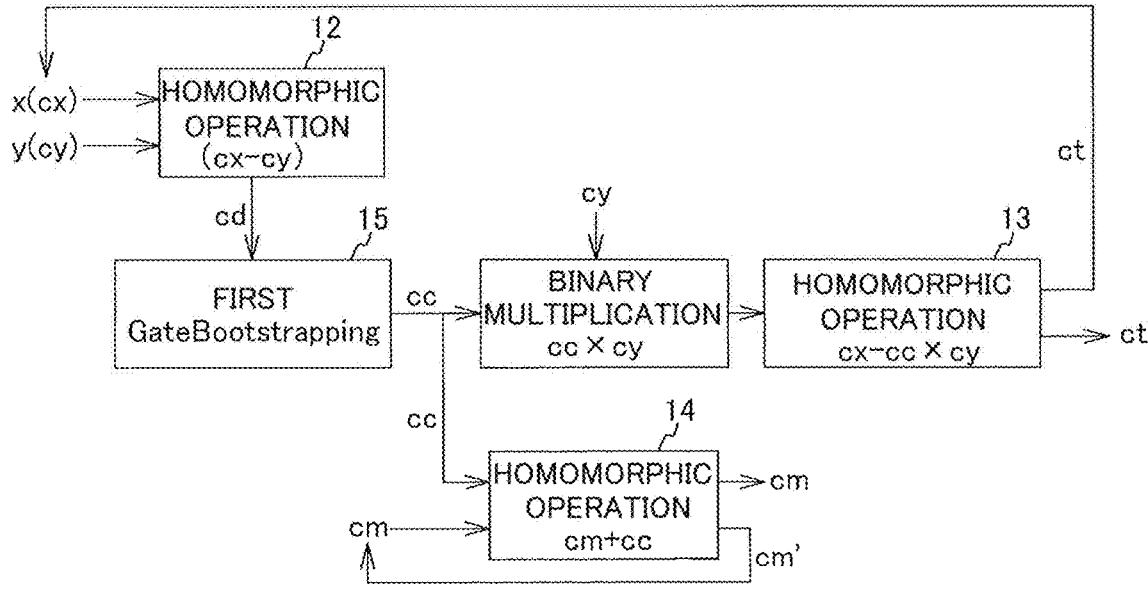
FIG. 2 is a detailed explanatory diagram of operation processes based on the functional configuration in FIG. 1.

FIG. 2 is a detailed explanatory diagram of operation processes based on the functional configuration in FIG. 1.

The configuration illustrated in FIG. 2 uses Gate Bootstrapping presented in the aforementioned paper. Gate Bootstrapping on TFHE presented in the aforementioned paper will be described in detail below.

The encryption processing apparatus 1 inputs a TLWE ciphertext cx (dividend) and a TLWE ciphertext cy (divisor) to the first operation unit 12 and performs a homomorphic operation (subtraction) cx-cy to obtain a TLWE ciphertext cd. The encryption processing apparatus 1 inputs the TLWE ciphertext cd to the first Bootstrapping unit 15, performs first Gate Bootstrapping, and outputs a binary TLWE ciphertext cc that determines whether cx-cy is positive or negative.

The encryption processing apparatus 1 inputs the ciphertext cc, the ciphertext cx, and the ciphertext cy to the second operation unit 13, performs an operation cx−cc×cy, and outputs a TLWE ciphertext ct that is a remainder. Multiplication cc×cy is multiplication between a binary number and an integer involving Gate Bootstrapping as described later, and may be performed by a binary operation unit separately.

The encryption processing apparatus 1 repeats obtaining the ciphertext cc and multiplication cx−cc×cy while setting the ciphertext ct of the remainder as the new ciphertext cx (dividend). The ciphertext ct obtained after (t/2)−1 repetitions is output as a final remainder (the result of a remainder operation), where (t/2)−1 is the possible maximum integer of a ciphertext.

The encryption processing apparatus 1 performs an operation cm+cc while using the ciphertext cc in the third operation unit 14 to obtain a ciphertext cm', where cm is an initial value.

The encryption processing apparatus 1 performs the operation cm+cc by setting the ciphertext cm' as the new ciphertext cm every time obtaining the ciphertext cc is repeated.

The ciphertext cm' obtained after (t/2)−1 repetitions is output as a final quotient (the result of division), where (t/2)−1 is the possible maximum integer of a ciphertext.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition or multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 3:
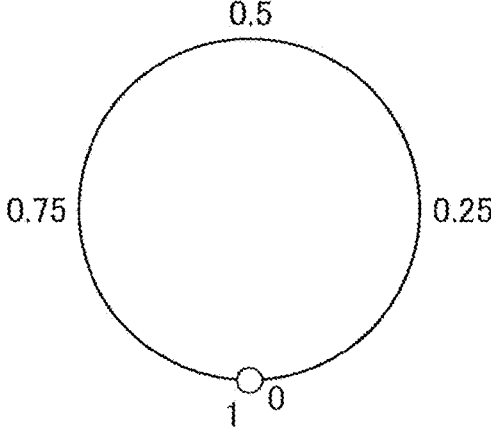
FIG. 3 is an image diagram for explaining a circle group that TLWE encryption has as a plaintext.

FIG. 3 is an image diagram for explaining a circle group that TLWE encryption has as a plaintext.

TLWE encryption has a real number that moves forward from 0 with a real number precision and, when reaching 1, returns to 0. TLWE encryption regards any point on a circle group {T} illustrated in FIG. 3 as a plaintext, and uses a range near 0 (including an error) and a range near μ (including an error) as a plaintext.

The point on the circle group {T} is also described as an "element" in the present specification.

An encryption processing apparatus handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] obtained by collecting N random numbers uniformly distributed is prepared as an element on the circle group {T}. In addition, a private key [s] obtained by collecting N values that can be 0 or 1 is prepared.

Assuming that a random number in the Gaussian distribution (the normal distribution) in which an average value is a plaintext u and a variance is preset to α is e, an example of a TLWE ciphertext is a pair ([a], [s]·[a]+e).

An average value of e when an infinite number of TLWE ciphertexts are created for the same plaintext μ is a plaintext μ, where μ is a plaintext without an error and e is a plaintext with an error.

Symbol "·" represents a dot product of vectors. This description is also applied to the following descriptions.

When [s]·[a]+e the described above is written as b, the TLWE ciphertext can be represented as ([a], b).

A function $\varphi_s(([a], b)=b−[s]·[a]=e$ is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $$\varphi_s(([a] + [a'], b + b')) = (b + b') − [s]·([a] + [a']) =$$

$$(b − [s]·[a]) + (b' − [s]·[a']) = \varphi_s([a], b) + \varphi_s([a'], b').$$

It is thus found that a TLWE ciphertext is a ciphertext obtained by "additive homomorphic encryption".

In TFHE in the aforementioned paper, various operations are achieved by repeating "performing an additive operation for TLWE ciphertexts each obtained by adding an error to a plaintext and reducing an error by Gate Bootstrapping".

In the following descriptions, a trivial ciphertext such as ([0], μ) is a TLWE ciphertext that can be decrypted with any private key, that is, a ciphertext that can be decrypted with any private key to provide the same plaintext.

In ([0], μ), [0] represents a zero vector.

Although the "trivial ciphertext" can be handled as a TLWE ciphertext, it can be considered as a state where a plaintext is placed in the ciphertext substantially as it is.

When the decryption function $\varphi_s$ is applied to the TLWE ciphertext ([0], μ), the private key [s] is multiplied by the zero vector [0] to disappear as represented by $\varphi_s(([0], μ))=μ−[s]·0=μ$. The plaintext μ is thus obtained easily. Such a ciphertext is a trivial ciphertext with regard to the plaintext μ.

A finite cyclic group used in Gate Bootstrapping in TFHE is described.

Gate Bootstrapping uses a factor ring of a polynomial ring as a finite cyclic group.

The following description explains that a factor ring of a polynomial ring is a finite cyclic group.

An n-th degree polynomial is generally represented by $a_n x^n + a_{n-1} x^{n-1} + \ldots + a_0$.

These all sets form a commutative group for a sum of polynomials $f(x) + g(x)$.

Further, a product of polynomials $f(x)g(x)$ has properties identical to those of the commutative group except that an inverse element is not necessarily present. Such a structure is called "monoid".

Regarding the sum and the product of polynomials, the distributive property is established as follows.

$$f(x)\{g(x) + g'(x)\} = f(x)g(x) + f(x)g'(x)$$

Therefore, when the sum and the product of polynomials are defined using polynomials as elements, a "ring" is formed, which is called "polynomial ring".

TFHE uses a polynomial ring including the circle group $\{T\}$ as coefficients, and such a polynomial ring is represented as $T[X]$.

When a polynomial $T(X)$, which is a polynomial ring, is decomposed into $T[X](X^n+1)+T[X]$, and only remainders are extracted and collected, a factor ring of a polynomial ring is obtained because the remainders also form a "ring".

In TFHE, a factor ring of a polynomial ring is represented as $T[X]/(X^n+1)$.

A polynomial $F(X) = \mu X^{n-1} + \mu X^{n-2} + \ldots + \mu X + \mu$ is extracted by using a desired coefficient $\mu$ ($\mu$ belongs to T) as an element of the factor ring of the polynomial ring $T[X]/(X^n+1)$.

When the element $F(X)$ of the factor ring of the polynomial ring is multiplied by X, $\mu X^{n-1} + \mu X^{n-2} + \ldots + \mu X - \mu$ is obtained, the coefficient of the top term appears as a constant term with a sign reversed from positive to negative.

When multiplication by X is further performed, the same phenomenon happens again as represented by $\mu X^{n-1} + \mu X^{n-2} + \ldots + \mu X^2 - \mu X - \mu$ (the coefficient of the top term appears as a constant term with a sign reversed from positive to negative).

When this multiplication is repeated n times, $-\mu X^{n-1} - \mu X^{n-2} \ldots \mu X - \mu$ is obtained, so that the coefficients of all terms become negative.

When multiplication by X is further continued, the coefficient of the top term becomes positive from negative and appears as a constant term as represented by $$-\mu X^{n-1} - \mu X^{n-2} \ldots - \mu X + \mu,$$

$$-\mu X^{n-1} - \mu X^{n-2} \ldots + \mu X + \mu.$$

When multiplication by X is repeated 2n times in total, the multiplication result returns to the original element of the factor ring of the polynomial ring $F(X) = \mu X^{n-1} + \mu X^{n-2} + \ldots + \mu X + \mu$. As described above, the highest-order coefficient ($\mu$) appears as the lowest-order constant term with a reversed sign ($-\mu$), and terms are shifted by one in whole.

That is, the polynomial $F(X) = \mu X^{n-1} + \mu X^{n-2} + \ldots + \mu X + \mu$ is a finite cyclic group of order 2n in a ring that is the factor ring of the polynomial ring $T[X]/(X^n+1)$.

In TFHE, an encryption processing apparatus achieves fully homomorphic encryption by using such properties of the polynomial $F(X)$ based on a factor ring of a polynomial ring.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of a polynomial ring $T[X]/(X^n+1)$ described above.

In order to obtain TRLWE encryption, elements of the factor ring of a polynomial ring $T[X]/(X^n+1)$ are selected at random.

In fact, n coefficients in an $(n-1)$th degree polynomial are selected as uniformly distributed random numbers from the circle group $\{T\}$.

When the degree of the polynomial is $n-1$, the polynomial is not divided by $X^n+1$, and it is not necessary to consider a remainder. Therefore, it is assumed that the $(n-1)$th degree polynomial is a polynomial $a(X)$.

A polynomial $s(X)$ used as a private key is structured as follows, by collecting n values each of which can be 0 or 1 at random.

$$s(X) = s_{n-1} X^{n-1} + s_{n-2} X^{n-2} + \ldots s_1 X + s_0$$

Assuming that n random numbers $e_i$ are random numbers in the Gaussian distribution (the normal distribution) in which an average value is a plaintext $\mu_i$ and a variance is $\alpha$, the following polynomial $e(X)$ is structured from these random numbers.

$$e(X) = e_{n-1} X^{n-1} + e_{n-2} X^{n-2} + \ldots e_1 X + e_0$$

Decomposition of $s(X) \cdot a(X) + e(X)$ is performed into $f(X)$ $(X^n+1) + b(X)$, and $b(X)$ is obtained.

Consequently, $(a(X), b(X))$ is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, $g(X)$ is determined in such a manner that $\varphi_s$ becomes an element of $T[X]/(X^n+1)$ serves as a decryption function, where $\varphi_s((a(X), b(X)) = b$ $(X) - s(X) \cdot a(X) + g(X)(X^n+1)$, as in TLWE encryption.

[Gadget Decomposition]

Gadget Decomposition is described.

A coefficient in a polynomial used in a TRLWE ciphertext is a real number that is an element of the circle group $\{T\}$ in FIG. 3 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial $F(X)$ of a TRLWE ciphertext is 2, one unit of decomposition is $Bg=2^2$, and decomposition into $l=3$ elements is performed. At this time, each element is arranged to enter between $-Bg/2$ and $Bg/2$.

A TRLWE ciphertext is a combination of two polynomials like $(a(X), b(X))$ as described above. Therefore, a TRLWE ciphertext d can be written as $$d = [0.75X^2 + 0.125X + 0.5, 0.25X^2 + 0.5X + 0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1}=0.25$.

Since $0.75=-0.25$ is established on the circle group $\{T\}$, decomposition can be performed as follows.

$$d = [0.75X^2 + 0.125X + 0.5, 0.25X^2 + 0.5X + 0.375] = [-0.25X^2 + $$
$$0.125X + 0.5, 0.25X^2 + 0.5X + 0.25 + 0.125] = [0.25 \times (-X^2 + 2) + $$
$$0.25^2 \times 2X + 0.25^3 \times 0, 0.25 \times (X^2 + 2X + 1)9 + 0.25^2X^2 \times 2 + 0.25^3 \times 0]$$

Therefore, when Gadget Decomposition is performed, a vector $$Dec(d) = [-X^2 + 2, 2X, 0, X^2 + 2X + 1, 2, 0]$$

is obtained.

An operator H of inverse transform from a vector to a ciphertext is also defined.

When the description is provided based on the example described above, $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

the above matrix becomes the operator H of inverse transform. A TRLWE ciphertext d' is obtained by performing an operation $Dec(d) \cdot H$. The lower bits are rounded off.

It can also be said that an operation of obtaining [v] that makes $\|d-[v] \cdot H\|$ minimum with respect to the TRLWE ciphertext d is Gadget Decomposition. Here, | | is a vector norm (length).

Ciphertexts $Zi=(a(X), b(X))$ formed by polynomials in which all coefficients of $e(X)$ have an average value of 0 and a variance is a are created. The number of the created ciphertexts is 2l.

The plaintext µ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

This ciphertext k is defined as a TRGSW ciphertext BK. The TRGSW ciphertext BK configures a Bootstrapping Key used below.

The Bootstrapping Key is described.

The Bootstrapping Key is used for encrypting a private key in order to use the private key in Gate Bootstrapping.

Separately from the private key [s] (Nth degree) used for TLWE ciphertexts, each element of a private key [s'] for encrypting the private key [s] is selected to be either of two values, i.e., 0 or 1 for use in Gate Bootstrapping.

It is necessary to make the degree of the private key [s'] the same as the degree n of polynomials used in TRLWE encryption.

The TRGSW ciphertext BK is created for each element of the private key [s].

When decryption with the private key [s'] is performed, 2l TRLWE ciphertexts Zj are created where $\varphi_{s'}(Zj)=0$ is satisfied.

$BK_i$ is then represented by $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

N TRGSW ciphertexts having this configuration are prepared, where N is the same as the degree of the private key [s]. A set of the thus prepared TRGSW ciphertexts is referred to as "Bootstrapping Key".

A cross product of the TRGSW ciphertext BKi and the TRLWE ciphertext d is defined as follows.

$$BKi \times d = Dec(d) \cdot BKi$$

Gadget Decomposition is an operation of obtaining [v] that makes $\|d-[v] \cdot H\|$ minimum with respect to the TRLWE ciphertext d.

Therefore, by using [v]=Dec(d) and an error $(\varepsilon_a(X), \varepsilon_b(X))$, $[v] \cdot H=d+(\varepsilon_a(X), \varepsilon_b(X))$ can be written.

As a result, $BKi \times d=Dec(d) \cdot BKi$ $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates a dot product, and $[v] \cdot H=d+(\varepsilon_a(X), \varepsilon_b(X))$ is substituted into the right side, $$= \sum\nolimits_{j=1}^{2\ell} v_j \times Z_j + s_i \times (d + (\epsilon_a(X), \epsilon_b(X)))$$

$$= \sum\nolimits_{j=1}^{2\ell} v_j \times Z_j + s_i \times d + s_i \times (\epsilon_a(X), \epsilon_b(X))$$

is obtained, and becomes the same as calculation of a sum of the following three ciphertexts c1, c2, and c3.

$$c_1 = \sum\nolimits_{j=1}^{2\ell} v_j \times Z_j$$

-continued $$c_2 = s_i \times d$$

$$c_3 = s_i \times (\epsilon_a(X), \epsilon_b(X))$$

Since TRLWE encryption is additive homomorphic encryption, calculating a sum of ciphertexts is the same as calculating a sum of plaintexts.

Since $c_1$ is obtained by adding several times of $Z_j$, an expected value of the plaintext $\varphi_s(c_1)$ is 0.

In addition, $\varphi_s(c_3)$ obtained by decryption is set to be sufficiently small also in the subsequent operations, because the magnitude of the absolute value of a plaintext can be limited by a system parameter.

In this case, $\varphi_s(BKi \times d) = \varphi_s(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1 - d_0$ is substituted for d, and $d_0$ is finally added, the following CMux function is completed.

$$CMux(BK_i, d_0, d_1) = BKi \times (d_1 - d_0) + d_0 = Dec(d_1 - d_0) \cdot BK_i + d_0$$

The CMux function outputs a ciphertext of the plaintext $\mu_0$ without decrypting the ciphertext when $s_i$ is 0, and outputs a ciphertext of the plaintext $\mu_1$ without decrypting the ciphertext when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using the various information described above.

Binary Gate Bootstrapping is configured by three steps described below, i.e., (1) BlindRotate, (2) SampleExtract, and (3) KeySwitching.

Figure 4:
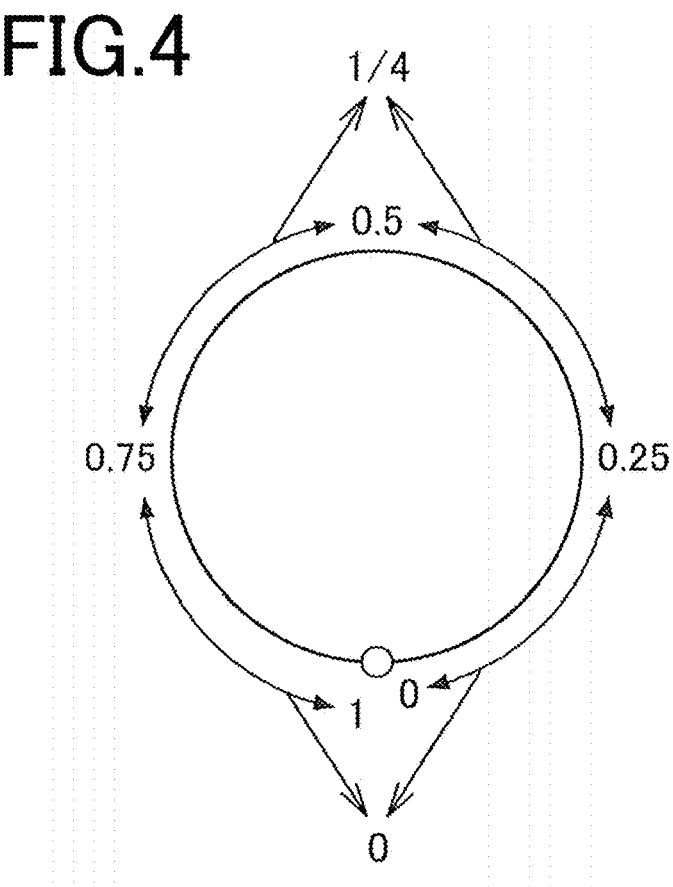
FIG. 4 is an operation image diagram of binary Gate Bootstrapping.

FIG. 4 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 (¼) or 0.75 (¾) to 1 on the circle group {T} in FIG. 3 is converted to a TLWE ciphertext 0, and a plaintext in a section from 0.25 (¼) to 0.75 (¾) is converted to a ciphertext 0.25 (¼).

An error added to the plaintext in this conversion is any error in a range of ±1/16.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, $\varphi s(c')$ is a plaintext obtained by applying a decryption function to the following LWE ciphertext c'.

In BlindRotate, the following polynomial T(X)

$$T(X) = F(X) \cdot X^{n/2}$$

is prepared, which is obtained by multiplying the following polynomial F(X)

$$F(X) = \mu X^{n-1} + \mu X^{n-2} + \dots \mu X + \mu$$

where $\mu = \frac{1}{8}$, that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext $c = ([a], b)$ is multiplied by 2n and is then rounded off, whereby a LWE ciphertext $c' = ([a'], b')$ is obtained.

When the LWE ciphertext $c' = ([a'], b')$ is decrypted, $\mu 1' = \varphi_s(c') \approx 2n \times \varphi_s(c) = 2n\mu 1$ is obtained. As n becomes larger, an error becomes smaller relatively.

A trivial TRLWE ciphertext (0, T(X)) whose plaintext is the polynomial T(X) is prepared, and it is assumed that $A_0 = X^{-b} \times (0, T(X)) = (0, X^{-b} \times T(X))$, where 0 indicates a 0th degree polynomial 0. Since b' is an integer, a power of X can be defined naturally.

Subsequently, $A_i = CMux(BK_i, A_{i-1}, X^{a'i}A_{i-1})$ is calculated in turn by using $BK_i$ that is the above-described Bootstrapping Key. Since a'i is an integer also in this expression, a power of X can be defined naturally.

Accordingly, the plaintext is not changed as it is when $s_i$ is 0, and multiplication by $X^{a'i}$ is performed in turn when $s_i$ is 1.

Therefore, when calculation is repeated as represented by $$\phi_{s'}(A_0) = X^{-b'} T(X)$$

$$\phi_{s'}(A_1) = X^{s_1 a'_1 - b'} T(X)$$

$$\phi_{s'}(A_2) = X^{s_2 a'_2 + s_1 a'_1 - b'} T(X),$$

then $$\phi_{s'}(A_n) = X^{\sum_{i=1}^{N} s_i \times a'_i - b'} T(X)$$

is obtained.

Here, $$\sum_{i=1}^{N} s_i \times a'_i - b'$$

is equal to the decryption function $\varphi s(c')$ with a sign reversed. Therefore, $$\phi_{s'}(A_n) = X^{-\phi s(c')} T(X)$$

is obtained. Here, $\varphi x'(A_n)$ is a ciphertext of a polynomial obtained by multiplying $\mu 1'$ times the polynomial T(X) by $X^{-1}$.

In association with the plaintext $\mu 1$ of the TLWE ciphertext c related to BlindRotate, unique values (up to 2n values including n coefficients and n values obtained by reversing the signs of the coefficients) in accordance with the number of times µ1' (=2nµ1) of multiplying the polynomial T(X) by X is obtained, and therefore this can be regarded as a kind of Look Up Table.

(2) SampleExtract

In the plaintext polynomial $\varphi_s(A_n)$ obtained by decrypting the TRLWE ciphertext $A_n$ obtained by BlindRotate in (1), $n/2-\varphi_s(c')$ terms from the lowest term have a coefficient of $-\mu$. When $\varphi_s(A_n)$ is negative, coefficients are $-\mu$ from the highest term in turn conversely.

When attention is paid only to a constant term of the plaintext polynomial $\varphi_s(A_n)$ obtained by decrypting the TRLWE ciphertext $A_n$, the constant term is u if $\varphi_s(c')$ is equal to or greater than n/2 and less than 3n/2, that is, $\varphi_s(c)$ is $\frac{1}{2}\pm\frac{1}{4}$. Otherwise, i.e., if $\varphi_s(c)$ is $\pm\frac{1}{4}$, the constant term is $-\mu$.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext cs is described.

All TRLWE ciphertexts can be expressed as (A(X), B(X)) by putting polynomials $$A(X) = \sum_{i=1}^{n} a_i X^{i-1}$$
$$B(X) = \sum_{i=1}^{n} b_i X^{i-1},$$

where n is the degree.

When decryption with the private key [s'] is performed, the expression can be expanded by putting a polynomial of the private key as $$S'(X) = \sum_{j=1}^{n} s'_j X^{j-1}.$$

Then, $$\phi_{s'}(c) = B(X) - S'(X) \cdot A(X) = \sum_{i=1}^{n} b_i X^{i-1} - \sum_{i=1}^{n} \sum_{j=1}^{n} a_i s'_j X^{(i+j-2)}$$

is obtained.

The following operation is then performed with regard to this expression.

$$\sum_{i=1}^{n} b_i X^{i-1} - \sum_{i=1}^{n} \sum_{j=1}^{n} a_i s'_j X^{(i+j-2)}$$

$$= \sum_{i=1}^{n} b_i X^{i-1} - \sum_{i=1}^{n} \sum_{j=i-1}^{n+i-2} a_i s'_{j-i+2} X^j$$

$$= \sum_{i=1}^{n} b_i X^{i-1} - \sum_{i=1}^{n} \sum_{j=i-1}^{n-1} a_i s'_{j-i+2} X^j - \sum_{i=1}^{n} \sum_{j=n}^{n+i-2} a_i s'_{j-i+2} X^j$$

$$= \sum_{j=1}^{n} b_j X^{j-1} - \sum_{j=0}^{n-1} \sum_{i=1}^{j+1} a_i s'_{j-i+2} X^j - \sum_{j=n}^{2n-2} \sum_{i=j-n+2}^{n} a_i s'_{j-i+2} X^j$$

$$= \sum_{j=0}^{n-1} b_{j+1} X^j - \sum_{j=0}^{n-1} \sum_{i=0}^{j} a_{i+1} s'_{j-i+1} X^j - \sum_{j=0}^{n-2} \sum_{i=j-n+1}^{-1} a_{i+n+1} s'_{j-i+1} X^{j+n}$$

$$= \sum_{j=0}^{n-2} b_{j+1} X^j + b_n X^{n-1} - \sum_{j=0}^{n-2} \sum_{i=0}^{j} a_{i+1} s'_{j-i+1} X^j - \sum_{i=0}^{n-1} a_{i+1} s'_{n-i} X^{n-1} -$$
$$\sum_{j=0}^{n-2} \sum_{i=j-n+1}^{-1} a_{i+n+1} s'_{j-i+1} X^{j+n}$$

$$= \sum_{j=0}^{n-2} \left( b_{j+1} X^j - \sum_{i=0}^{j} a_{i+1} s'_{j-i+1} X^j - \sum_{i=j-n+1}^{-1} a_{i+n+1} s'_{j-i+1} X^{j+n} \right) + b_N X^{n-1} -$$
$$\sum_{i=0}^{n-1} a_{i+1} s'_{n-i} X^{n-1}$$

Since this is "factor ring of polynomial ring", a remainder when this is divided by $(X^n+1)$ is calculated. Then, $$\sum_{j=0}^{n-2} \left( b_{j+1} X^j - \sum_{i=0}^{j} a_{i+1} s'_{j-i+1} X^j + \sum_{i=j-n+1}^{-1} a_{i+n+1} s'_{j-i+1} X^j \right) +$$

$$b_N X^{n-1} - \sum_{i=0}^{n-1} a_{i+1} s'_{n-i} X^{n-1} =$$

$$\sum_{j=0}^{n-2} \left( b_{j+1} - \sum_{i=0}^{j} a_{i+1} s'_{j-i+1} + \sum_{i=j-n+1}^{-1} a_{i+n+1} s'_{j-i+1} \right) X^j +$$

$$\left( b_n - \sum_{i=0}^{n-1} a_{i+1} s'_{n-i} \right) X^{n-1}$$

is obtained.

Further, when $$a'_i = \begin{cases} a_i & (i \geq 1) \\ -a_{i+n} & (\text{otherwise}) \end{cases}$$

is put, then $$= \sum_{j=0}^{n-2} \left( b_{j+1} - \sum_{i=0}^{j} a'_{i+1} s'_{j-i+1} - \sum_{i=j-n+1}^{-1} a'_{i+1} s'_{j-i+1} \right) X^j +$$

$$\left( b_N - \sum_{i=0}^{n-1} a'_{i+1} s'_{n-i} \right) X^{n-1}$$

$$= \sum_{j=0}^{n-2} \left( b_{j+1} - \sum_{i=j-n+1}^{j} a'_{i+1} s'_{j-i+1} \right) X^j + \left( b_N - \sum_{i=0}^{n-1} a_{i+1} s'_{n-i} \right) X^{n-1}$$

$$= \sum_{j=0}^{n-2} \left( b_{j+1} - \sum_{i=0}^{n-1} a'_{i+j-n+2} s'_{n-i} \right) X^j + \left( b_n - \sum_{i=0}^{n-1} a_{i+1} s'_{n-i} \right) X^{n-1}$$

$$= \sum_{j=0}^{n-2} \left( b_{j+1} - \sum_{i=0}^{n-1} a'_{i+j-n+2} s'_{n-i} \right) X^j$$

is obtained, and coefficients of respective terms in a plaintext polynomial are obtained from $$\phi_{s'}(c) = \sum_{j=0}^{n-1} \left( b_{j+1} - \sum_{i=0}^{n-1} a'_{i+j-n+2} s'_{n-i} \right) X^j.$$

Among the obtained coefficients, a coefficient of a constant term is necessary. Therefore, when a coefficient for j=0 is extracted, $$b_1 - \sum_{i=0}^{n-1} a'_{i-n+2} s'_{n-i}$$

is obtained. When $$a''_i = a'_{-i+2}$$

is put, the extracted coefficient can be transformed to a decryption function of TLWE encryption as represented by $$b_1 - \sum_{i=0}^{n-1} a''_{n-i} s'_{n-i} = b_1 - \sum_{i=0}^{n-1} a''_i s'_i = b_1 - \vec{s'} \cdot \vec{a''} = \phi_{s'}\left(\vec{a''}, b_1\right).$$

That is, when coefficients are extracted from the TRLWE ciphertext $A_n = (A(X), B(X))$ obtained by BlindRotate in (1) while the coefficients are set as $$a''_i = \begin{cases} a_i & (i = 1) \\ -a_{-i+n+2} & (\text{otherwise}) \end{cases},$$

a new TLWE ciphertext $([a''], b_1)$ is obtained which has, as a plaintext, the same value as a constant term of a plaintext polynomial corresponding to the original TRLWE ciphertext $A_n$. This new TLWE ciphertext is the output of SampleExtract and has either of two types, i.e., $-\mu$ or $\mu$ as a plaintext.

A TLWE ciphertext $cs = ([a''], b_1) + ([0], \mu)$ obtained by adding a trivial ciphertext $([0], \mu)$ of which plaintext is $\mu$ to the thus obtained TLWE ciphertext is obtained.

Specifically, since $\mu$ is $\frac{1}{8}$ in the polynomial $F(X)$ as a test vector, a ciphertext of $-\frac{1}{8}$ or $\frac{1}{8}$ is obtained in this stage.

When a trivial TLWE ciphertext $([0], \frac{1}{8})$ of which a plaintext is $\mu = \frac{1}{8}$ is added to the output result of SampleExtract, $$-1/8 + 1/8 = 0$$

$$1/8 + 1/8 = 1/4$$

are established, and thus a new TLWE ciphertext cs having either of two values, i.e., 0 or $\frac{1}{4}$ as a plaintext is obtained.

(3) KeySwitching

The TLWE ciphertext cs obtained by using SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of KeySwitching is described.

The private key [s] of a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1} \ s'_i \times 2^{-2} \ s'_i \times 2^{-3} \ \dots.$$

The private key is [s]. A "number of digits" t is a system parameter.

When decryption is performed with the private key [s], $$\phi_s(KS_{i,j}) = s'_i \times 2^{-j}$$

is obtained. This is a "KeySwitching key".

As described above, the TLWE ciphertext $cs = ([a], b)$ obtained in (2) is 0 or $\frac{1}{4}$ obtained by encryption with the private key [s']. The number of elements of [a] is the same as that of the private key [s'] and is n.

When the elements are converted to t-bit fixed-point numbers one by one, the elements can be written in the following form.

$$a_i \approx \sum_{j=1}^{t} a_{i,j} \times 2^{-j}$$

Although an error is increased in this stage, the maximum value of the absolute value can be limited by a system parameter.

As main processing of KeySwitching, the following TLWE ciphertext cx is calculated.

$$cx = \left(\vec{0}, b\right) - \sum_{i=1}^{n} \sum_{j=1}^{t} a_{i,j} \times KS_{i,j}$$

Since the term $([0], b)$ is a trivial ciphertext, this term is b when being decrypted. A result of decryption of the TLWE ciphertext cx is calculated as follows.

$$\phi_s(cx) = b - \sum_{i=1}^{n} \sum_{j=1}^{t} a_{i,j} \times s'_i \times 2^{-j} = b - \sum_{i=1}^{n} \sum_{j=1}^{t} s'_i \times a_{i,j} \times 2^{-j}$$

Since $s'_i$ is a constant for j, it is factored out as follows.

$$= b - \sum_{i=1}^{n} s'_i \sum_{j=1}^{t} a_{i,j} \times 2^{-j}$$

The expression obtained by decomposition into fixed-point numbers descried above is then substituted.

$$\approx b - \sum_{i=1}^{n} s'_i \times a_i = \phi_{s'}\left(\left(\vec{a}, b\right)\right) = \phi_{s'}(c_s)$$

As a result, $$\phi_s(cx) \approx \phi_{s'}(c_s)$$

is obtained. That is, switching of keys is successful.

The TLWE ciphertext cx obtained here is encrypted with the private key [s] that is the same as a private key for the TLWE ciphertext c used as the input of Gate Bootstrapping.

By performing the processing of KeySwitching, the ciphertext returns to the TLWE ciphertext encrypted with the private key [s], so that its plaintext $\varphi_s(cx)$ is 0 when $\varphi_s(c)$ is in a range of $\pm\frac{1}{4}$, and is $\frac{1}{4}$ when $\varphi_s(c)$ is in a range of $\frac{1}{2}+\frac{1}{4}$.

By the processing described above, a TLWE ciphertext is obtained as a result of Gate Bootstrapping, which is either of two values, i.e., 0 or $\frac{1}{4}$ and has any error within $\pm\frac{1}{16}$.

The maximum value of the error does not depend on the TLWE ciphertext c that is the input, and is a value fixed by a system parameter.

Therefore, the system parameter is set in such a manner that the maximum value of the error is any value within $\pm\frac{1}{16}$ that is the same range as that for a TLWE ciphertext as the input.

This setting enables a NAND operation to be performed any number of times, and enables any operation including addition and multiplication to be performed.

Examples of an error added to a "plaintext" of a TLWE ciphertext output from Gate Bootstrapping include an error added by converting a TLWE ciphertext to an integer, an error added by CMux, and an error when the TLWE ciphertext is converted to a fixed-point number by KeySwitching. All these errors can be limited by a system parameter, and the system parameter can be adjusted in such a manner that an error for which all things are considered falls within $\pm\frac{1}{16}$.

The processing described above is processing of Gate Bootstrapping in TFHE.

As described above, TFHE is Bit-wise type homomorphic encryption that has zero or non-zero as a plaintext and enables a logical operation to be performed. However, the plaintext is a real number from 0 to 1 associated with the circle group $\{T\}$, as described with reference to FIG. 3. Therefore, by associating sections obtained by dividing the circle group $\{T\}$ with integers in turn, TFHE can be applied as Integer-wise type homomorphic encryption having an integer as a plaintext.

The aforementioned paper states that a TLWE ciphertext used in TFHE is additive homomorphic for plaintexts on a circle group, and it is obvious that the TLWE ciphertext used in TFHE can be subjected to addition (subtraction).

Division and a remainder operation are further made possible by the method described below. When division and a remainder operation become possible, TFHE can be used as homomorphic encryption that can be subjected to Integer-wise type four arithmetic operations, together with addition and a part of multiplication that are already known. Thus, more efficient processing can be performed as compared with bit-by-bit computation in Bit-wise type TFHE.

Figure 5:
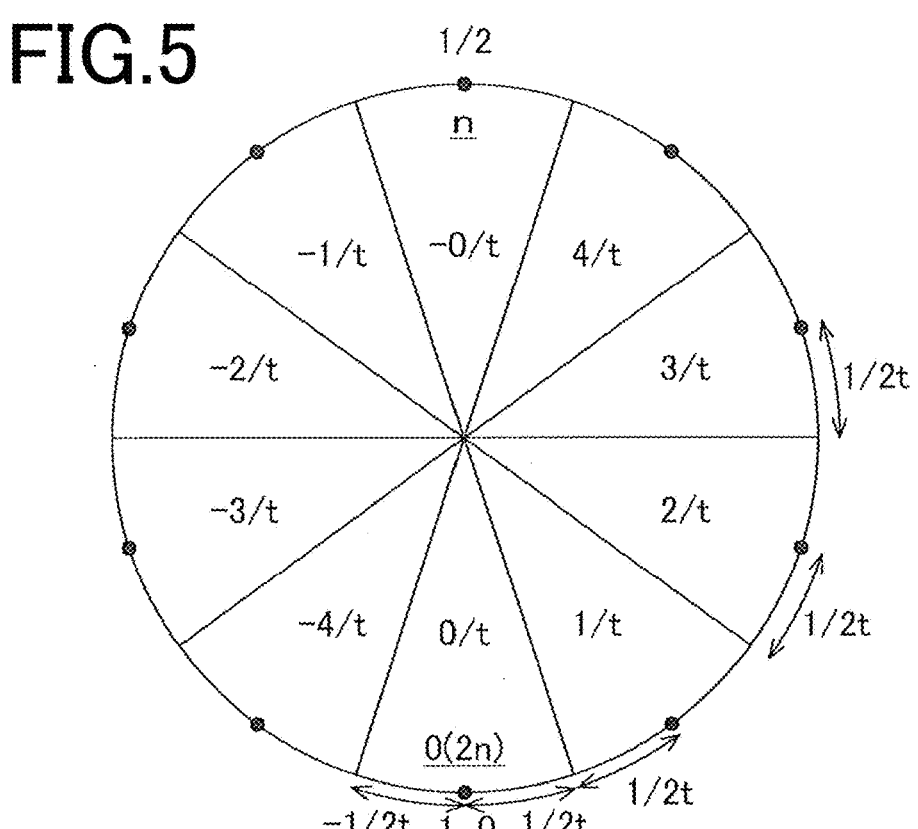
FIG. 5 is an explanatory diagram of TFHE applied to an Integer-wise type.

FIG. 5 is an explanatory diagram of TFHE applied to the Integer-wise type.

As illustrated in FIG. 5, the range from 0 to 1 associated with the circle group $\{T\}$ is divided into t. For a TLWE ciphertext, possible values of a plaintext are t values obtained by dividing the range from 0 to 1, i.e., from $-(t/2)$ to $(t/2)-1$, and $(t/2)-1$ is the maximum value of the integer that can be recorded in one TLWE ciphertext.

As exemplified in FIG. 5, assuming that t is set to 10 and the range from 0 to 1 is divided into 10, a ciphertext can represent integers of $-5$, $-4$, $-3$, $-2$, $-1$, 0, 1, 2, 3, and 4.

In this case, these integer values are respectively assigned to sections obtained by dividing the range from 0 to 1 of the circle group $\{T\}$ by $t=10$, i.e., sections of $-4/t$, $-3/t$, $-2/t$, $-1/t$, $-0/t$, $4/t$, $3/t$, $2/t$, $1/t$, and $0/t$.

As illustrated in FIG. 5, 0 (1) on the circle group $\{T\}$ is within the range of a region from $-\frac{1}{2}t$ to $\frac{1}{2}t$. As for a plaintext of a ciphertext on the circle group $\{T\}$, the position in the region (the position on the circle group $\{T\}$) can be adjusted by addition or subtraction of an offset based on, for example, $\frac{1}{2}t$, as necessary.

When the value of t is made larger and the circle group $\{T\}$ is more finely divided, the integer value that can be recorded in a TLWE ciphertext can be made larger. However, when the circle group is divided excessively finely, there is a problem that the range of an error to be added to the plaintext becomes excessively small, which results in decrease in the strength of encryption. This point will be described later.

The encryption processing apparatus 1 of the present embodiment realizes division and a remainder operation on Integer-wise type TFHE by the following method.

The encryption processing apparatus 1 generates, by using Gate Bootstrapping presented in the aforementioned paper, a ciphertext that determines whether the result of subtraction of a divisor from a dividend is positive or negative.

The encryption processing apparatus 1 configures a ternary operator Mux by using the generated ciphertext (the ciphertext cc described later) that determines whether the result is positive or negative, and realizes division and a remainder operation.

As described above, the encryption processing apparatus 1 sets the number t by which the range from 0 to 1 of the circle group $\{T\}$ is divided. In this case, $(t/2)-1$ becomes the maximum integer that can be recorded in one TLWE ciphertext.

Next, the encryption processing apparatus 1 sets a system parameter in TFHE.

Although the procedure is unchanged from that in the aforementioned paper, the degree n of a polynomial in TRLWE encryption (the polynomial $F(X)$ as a test vector) is preferably a multiple of t. Further, the system parameter is set in such a manner that, in a ciphertext obtained after Gate Bootstrapping, the range of an error added to a plaintext is less than $\pm 1/(2t)$.

It is assumed that there are a TLWE ciphertext cx as a dividend and a TLWE ciphertext cy as a divisor.

The TLWE ciphertext cx has a real number x/t corresponding to the integer x that cannot be known without a private key, as its plaintext.

The TLWE ciphertext cy has a real number y/t corresponding to the integer y that cannot be known without a private key, as its plaintext.

(1) The encryption processing apparatus 1 substitutes a trivial ciphertext $(0, 1/(2t))$ corresponding to the integer 0 into the ciphertext cm corresponding to a quotient that is the result of division. Here, $1/(2t)$ is an offset for setting the center of a slice obtained by dividing a circle group and may be different depending on implementation.

The encryption processing apparatus 1 (the first operation unit 12) performs the homomorphic operation cx−cy to obtain the ciphertext cd.

From x/t−y/t, the TLWE ciphertext cd has $(x-y)/t$ as a plaintext.

(2) The encryption processing apparatus 1 (the first Bootstrapping unit 15) performs Gate Bootstrapping using the TLWE ciphertext cd as input.

Although the aforementioned paper obtains a test vector polynomial by multiplying the test vector $F(X)=\mu X^{n-1}+\mu X^{n-2}+\ldots \mu X+\mu$ by $X^{n/2}$, the present embodiment performs BlindRotate by using the test vector $F(X)$ as the test vector polynomial as it is. It is assumed that the coefficient $\mu=1/(2t)$.

When SampleExtract and KeySwitching are performed as described in the aforementioned paper, $1/(2t)$ is obtained when $x \geq y$ ($x-y$ is 0 or positive), and $-1/(2t)$ is obtained when $x < y$ ($x-y$ is negative).

The encryption processing apparatus 1 adds a trivial ciphertext (0, 1/(2t)) to the above result, thereby obtaining the TLWE ciphertext cc corresponding to whether x−y is positive or negative.

The TLWE ciphertext cc has either of two values of 0 and 1/t as a plaintext. When x≥y (x−y is 0 or positive), the TLWE ciphertext cc has 1/t (symbol 1) as a plaintext. When x<y (x−y is negative), the TLWE ciphertext cc has 0 (symbol 0) as a plaintext.

(3) The encryption processing apparatus 1 (the second operation unit 13) calculates ct=cx−cc×cy. Multiplication (cc×cy) between the integer ciphertext cy and the binary ciphertext cc can be performed by a separate process by a binary multiplication unit described below.

The TLWE ciphertext ct is a remainder of homomorphic subtraction of the TLWE ciphertext cy from the TLWE ciphertext cx.

As the result of multiplication between the integer ciphertext cy and the binary ciphertext cc, the ciphertext cy is obtained as it is when cc is the symbol 1, and 0 is obtained when cc is the symbol 0.

Therefore, as a result of calculation of the ciphertext ct, when $x \geq y$ (*cc* is the symbol 1), $$ct - cx - cc \times cy = cx - cy,$$

and when $x < y$ (*cc* is the symbol 0), $$ct = cx - cc \times cy = cx - 0 = cx.$$

(4) The encryption processing apparatus 1 accumulates the value of cc by calculating $$cm' = cm + cc.$$

The ciphertext cc is the binary symbol 1 when the plaintext is 1/t and the binary symbol 0 when the plaintext is 0. By accumulating the value of cc in accordance with the calculation result obtained when x≥y, the value of cm' can be calculated as the quotient.

The encryption processing apparatus 1 substitutes the TLWE ciphertext ct into the TLWE ciphertext cx and substitutes the TLWE ciphertext cm' into the TLWE ciphertext cm.

By substitution of the TLWE ciphertext ct into the TLWE ciphertext cx, the value after the TLWE ciphertext cy is subtracted once becomes a new value of the TLWE ciphertext cx. By substitution of the TLWE ciphertext cm' into the TLWE ciphertext cm, the TLWE ciphertext cm' becomes a new value of the TLWE ciphertext cm. The encryption processing apparatus 1 then repeats (1) obtaining the TLWE ciphertext cd by cx-cy;
(2) obtaining the TLWE ciphertext cc by Gate Bootstrapping using the TLWE ciphertext cd as input;
(3) obtaining the TLWE ciphertext ct by cx−cc×cy; and
(4) obtaining the TLWE ciphertext cm' by cm+cc,
(t/2)−1 times in total.

An identical result is also obtained by setting μ=−1/(2t) and calculating ct=cd+cc×cy.

Regarding normal plaintexts, it is possible to obtain the number of repetitions when subtraction of a divisor from a dividend is repeated as much as possible and a fraction of the subtraction result, as the result of division (quotient) and the result of a remainder operation (remainder), respectively. However, regarding ciphertexts, since the result of subtraction is also encrypted, it is impossible to determine whether subtraction is no longer possible after subtraction of the divisor from the dividend is repeated, and it is also impossible to perform a branch process that stops subtraction when subtraction is no longer possible.

In the present embodiment, the binary TLWE ciphertext cc is output which determines whether cx−cy is positive or negative based on the result of the operation cx-cy as described above.

While cx≥cy, the ciphertext cc is the symbol 1, and cy continues to be subtracted from cx (or ct substituted thereinto) every time subtraction is repeated.

When it becomes cx (ct)<cy as a result of repetition of subtraction, the ciphertext cy becomes the symbol 0, and cc is no longer subtracted from cx (or ct substituted thereinto) every time subtraction is repeated. Since the value of the ciphertext cc cannot be known without being decrypted, it cannot be determined whether cx≥cy or cx (ct)<cy.

Therefore, the encryption processing apparatus 1 repeats subtraction (t/2)−1 times, where (t/2)−1 is the maximum integer that a ciphertext can take.

Further, the encryption processing apparatus 1 adds the ciphertext cc every time the ciphertext cc is obtained. As described above, while cx≥cy, the ciphertext cc is the symbol 1, and when cx (ct)<cy, the plaintext cc is the symbol 0.

Only the symbol 1 while cx≥cy is added, and the symbol 0 is not added substantially. Therefore, the number of repetitions of subtraction of cy from cx while cx≥cy (the division result) is obtained by adding cc (t/2)−1 times.

According to this method, it is possible to perform division and a remainder operation between ciphertexts only by repeating a predetermined process (t/2)−1 times without performing determination whether subtraction cx−cy is possible, which cannot be known in an encrypted state, or performing a branch process.

As described above, the encryption processing apparatus 1 of the present embodiment generates a ciphertext that determines whether the result of subtraction is positive or negative by Gate Bootstrapping presented in the aforementioned paper. By applying a method of multiplication between ciphertexts by using the thus generated ciphertext, a ternary operator Mux is configured, and division is realized.

Figure 6:
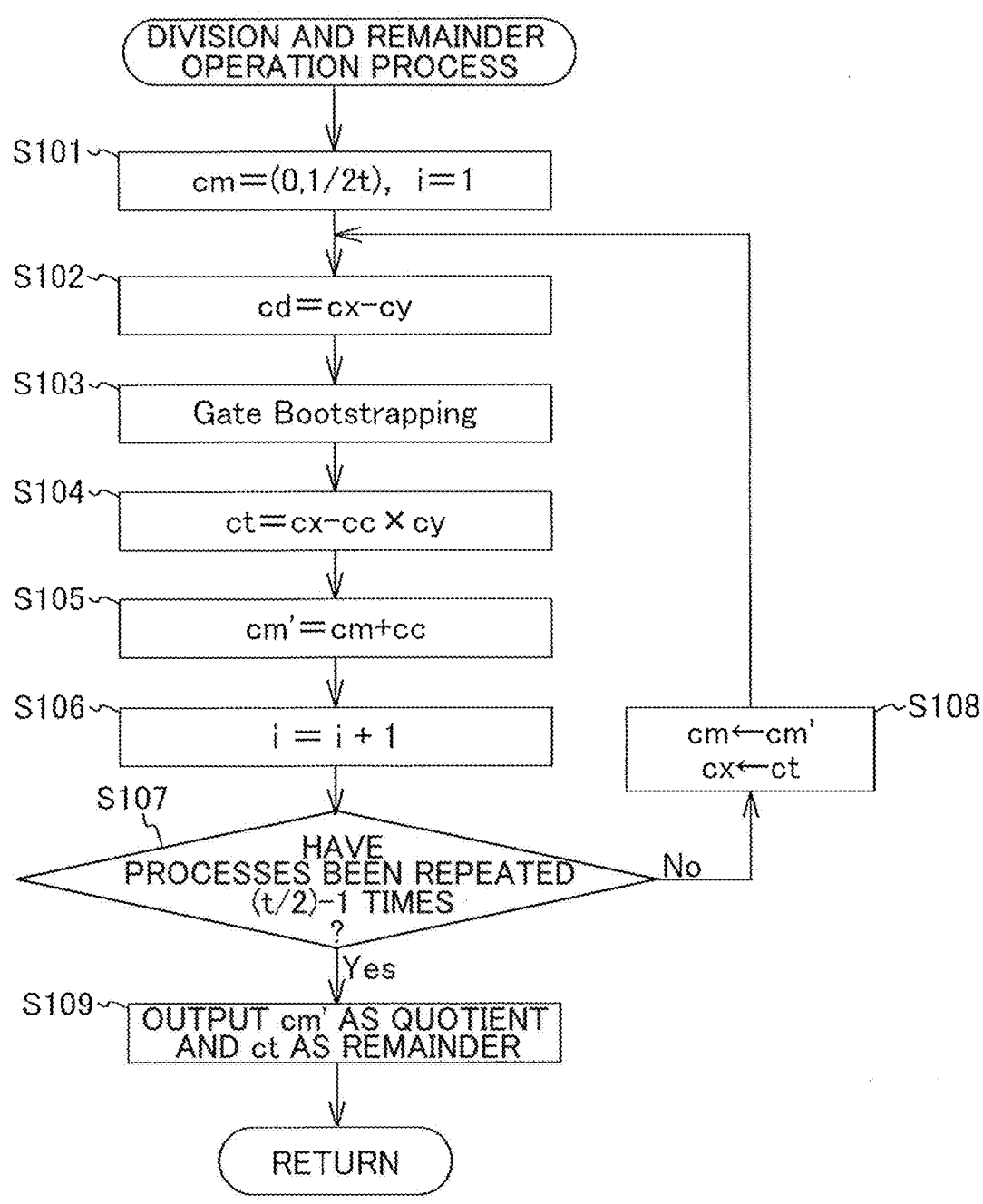
FIG. 6 is a flowchart for explaining a division and remainder operation process.

FIG. 6 is a flowchart for explaining a division and remainder operation process.

The encryption processing apparatus 1 sets cm=(0, 1/(2t)), that is, substitutes a trivial ciphertext corresponding to the integer 0 at Step S101. Further, the encryption processing apparatus 1 sets i to 1.

The encryption processing apparatus 1 (the first operation unit 12) performs an operation cx−cy to obtain the ciphertext cd at Step S102.

At Step S103, the encryption processing apparatus 1 (the first Bootstrapping unit 15) performs Gate Bootstrapping using the TLWE ciphertext cd as input to obtain the TLWE ciphertext cc.

At Step S104, the encryption processing apparatus 1 (the second operation unit 13) calculates cx−cc×cy to obtain the TLWE ciphertext ct. Here, cc×cy can be calculated by a binary operation unit separately.

At Step S105, the encryption processing apparatus 1 (the third operation unit 14) calculates cm+cc to obtain the TLWE ciphertext cm'.

The encryption processing apparatus 1 increments the variable i by 1 at Step S106.

At Step S107, the encryption processing apparatus 1 determines whether the processes from Steps S102 to S105 are repeated (t/2)−1 times (whether the value of the variable i has reached (t/2)−1).

When determining that the number of repetitions has not reached (t/2)−1 (No at Step S107), the encryption processing apparatus 1 substitutes cm' to cm and also substitutes ct to cx at Step S108, and repeats the processes from Steps S102 to S106.

When determining that the number of repetitions has reached (t/2)−1 (Yes at Step S107), the encryption processing apparatus 1 outputs the value cm' (the output value of the third operation unit 14) at that time as a ciphertext corresponding a quotient at Step S109. The encryption processing apparatus 1 also outputs the ciphertext ct (the output value of the second operation unit 13) at that time as a ciphertext corresponding a remainder value.

With the above processes, division and a remainder operation between Integer-wise type TLWE ciphertexts can be performed.

Another example of realizing division between ciphertexts is described. According to this example, a quotient is obtained as a ratio, and division can be performed at higher speed than in the example of FIG. 6 in which division and a remainder operation are performed.

Similarly to the case of FIG. 6, it is assumed that a ciphertext of the dividend x is the ciphertext cx, a ciphertext of the divisor y is the ciphertext cy, and a ciphertext of the result of a homomorphic operation corresponding to x/y is a ciphertext cf.

The encryption processing apparatus 1 initializes the ciphertext cf as cf=(0, 1/(2t)), where (0, 1/(2t)) is a trivial ciphertext having 1/(2t) as a plaintext. Here, 1/(2t) is an offset for setting the center of a slice obtained by dividing a circle group and may be different depending on implementation.

(1) The encryption processing apparatus 1 calculates the homomorphic operation cx−cy on the ciphertexts cx and cy to obtain the ciphertext cd.

(2) The encryption processing apparatus 1 performs Gate Bootstrapping on the ciphertext cd to obtain the new ciphertext cc that becomes 1/t or 0 depending on whether cx−cy is positive or negative. In Gate Bootstrapping, when SampleExtract and KeySwitching are performed as described in the aforementioned paper, 1/(2t) is obtained when x≥y (x−y is 0 or positive), and −1/(2t) is obtained when x<y (x−y is negative).

The encryption processing apparatus 1 adds a trivial ciphertext (0, 1/(2t)) to the result of Gate Bootstrapping, thereby obtaining the TLWE ciphertext cc corresponding to whether x−y is positive or negative.

The TLWE ciphertext cc has either of two values of 0 and 1/t as a plaintext. When x≥y (x−y is 0 or positive), the TLWE ciphertext cc has 1/t (symbol 1) as a plaintext. When x<y (x−y is negative), the TLWE ciphertext cc has 0 (symbol 0) as a plaintext.

The processes so far are the same as those in FIG. 6 in which division and a remainder operation are performed.

(3) The encryption processing apparatus 1 calculates cx=cx−cc×cy.

Multiplication (cy×cc) between the integer ciphertext cy and the binary ciphertext cc can be performed by a separate process by a binary multiplication unit described below.

(4) The encryption processing apparatus 1 calculates cf=cf×2+cc.

(5) The encryption processing apparatus 1 multiplies the ciphertext cx by 2 by a scalar of an integer.

(6) The encryption processing apparatus 1 calculates i=i+1.

When the processes from (1) to (6) are repeated m=log_2 (t) times, values are stored in the ciphertext cf from the most significant bit in turn, so that the TLWE ciphertext cf corresponding to a ratio f of x to y is obtained.

Details are described below. The TLWE ciphertext cc has either of two values of 0 and 1/t as a plaintext. When cx≥cy (cx−cy is 0 or positive), the TLWE ciphertext cc has 1/t (symbol 1) as a plaintext. When cx<cy (cx−cy is negative), the TLWE ciphertext cc has 0 (symbol 0) as a plaintext.

Multiplication between the integer ciphertext cy and the binary ciphertext cc can be performed by a binary operation unit in the method described below. As a result of cc×cy, the ciphertext cy is obtained as it is when the ciphertext cc is the symbol 1, and 0 is obtained when the ciphertext cc is the symbol 0.

Accordingly, as a result of calculation of the ciphertext cc in (2) based on cx−cy in (1) described above and calculation cx=cx−cc×cy in (3), when cx≥cy (cc is the symbol 1), cx=cx−cc×cy (cc×cy continues to be subtracted from cx). In association with the subtraction, cf=cf×2+cc, so that the ciphertext cf is doubled, and lower bits are set in an appropriate manner.

The TLWE ciphertext cf obtained as a result of m=log_2 (t) repetitions of obtaining the new ciphertext cc, the new ciphertext cx, and the new ciphertext cf described above has $$\left\lfloor \frac{tx/y}{2t} \right\rfloor$$

corresponding to x/y as a plaintext.

Regarding plaintexts, it is possible to obtain the number of repetitions when subtraction of a divisor from a dividend is repeated as much as possible as a division result. However, regarding ciphertexts, since the result of subtraction is also encrypted, it is impossible to determine whether subtraction is no longer possible after subtraction of the divisor from the dividend is repeated, and it is also impossible to perform a branch process that stops subtraction when subtraction is no longer possible.

In the present embodiment, the binary TLWE ciphertext cc that determines whether cx−cy is positive or negative is output based on the result of the operation cx−cy as described above.

While cx≥cy, the ciphertext cc is the symbol 1, and cy continues to be subtracted from cx every time subtraction is repeated, as described above. When it becomes cx<cy as a result of repetition of subtraction, the ciphertext cc becomes the symbol 0, and cy is no longer subtracted from cx every time subtraction is repeated. Since the value of the ciphertext cc cannot be known without being decrypted, it cannot be determined whether cx≥cy or cy<cx.

Meanwhile, the encryption processing apparatus 1 repeats the processes from (1) to (6) m=log_2(t) times. Although the maximum integer that can be recorded in one TLWE ciphertext is $\sqrt{t}-1$, the number of possible integers of a ciphertext is $m=\log\_2(t)$, where m is a value that provides t when 2 is raised to the m power.

The encryption processing apparatus 1 adds the ciphertext cc to the ciphertext cf every time the ciphertext cc is obtained. While $cx\geq cy$, the ciphertext cc is the symbol 1, and when $cx<cy$, the plaintext cc is the symbol 0, as described above.

Only the symbol 1 while $cx\geq cy$ is added to the ciphertext cf, the symbol 0 is not added to the ciphertext cf substantially, and the ciphertext cf is doubled every time the calculation of $cf=cf\times2+cc$ is repeated. Therefore, by performing addition of cc $\log\_2(t)$ times, the number of repetitions of subtraction of cy from cx while $cx\geq cy$ (the division result) is obtained.

According to this method, it is possible to perform division between ciphertexts by repeating a predetermined process $\log\_2(t)$ times, without performing determination whether subtraction $cx-cy$ is possible, which cannot be known in an encrypted state, or performing a branch process.

Figure 7:
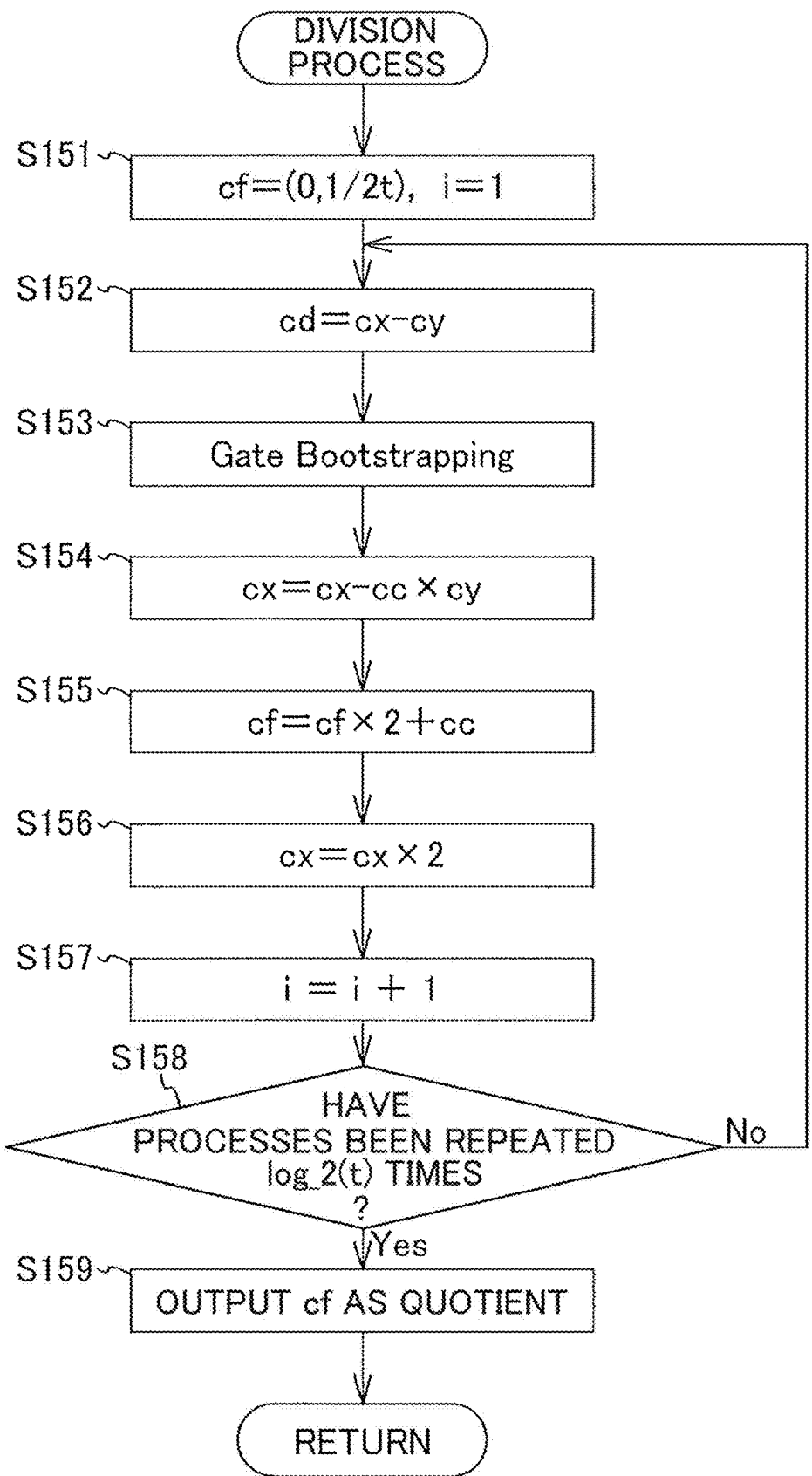
FIG. 7 is a flowchart for explaining a division process according to a modification.

FIG. 7 is a flowchart for explaining a division process according to a modification.

At Step S151, the encryption processing apparatus 1 sets $cf=(0, 1/(2t))$, that is, substitutes a trivial ciphertext corresponding to the integer 0. Further, the encryption processing apparatus 1 sets i to 1.

At Step S152, the encryption processing apparatus 1 calculates $cx-cy$ to obtain the TLWE ciphertext cd.

At Step S153, the encryption processing apparatus 1 performs Gate Bootstrapping using the TLWE ciphertext cd as input to obtain the TLWE ciphertext cc.

At Step S154, the encryption processing apparatus 1 calculates $cx=cx-cc\times cy$. Here, $cc\times cy$ can be calculated by a binary operation unit separately.

At Step S155, the encryption processing apparatus 1 calculates $cf=cf\times2+cc$.

At Step S156, the encryption processing apparatus 1 calculates $cx=cx\times2$.

At Step S157, the encryption processing apparatus 1 increments the variable i by 1.

At Step S158, the encryption processing apparatus 1 determines whether the processes from Steps S152 to S157 have been repeated $\log\_2(t)$ times (whether the value of the variable i has reached $\log\_2(t)$).

When determining that the number of repetitions has not reached $\log\_2(t)$ (No at Step S158), the encryption processing apparatus 1 repeats the processes from Steps S152 to S157.

When determining that the number of repetitions has reached $\log\_2(t)$ (Yes at Step S158), the encryption processing apparatus 1 outputs the value of cf at that time as a ciphertext corresponding a quotient at Step S159.

With the above processes, division between Integer-wise type TLWE ciphertexts can be performed.

[Multiplication Between Integer Ciphertext and Binary Ciphertext (Binary Multiplication)]

Multiplication between the integer ciphertext cy and the binary ciphertext cc by a binary multiplication unit can be performed in the following manner, for example.

In the present embodiment, the range from 0 to 1 associated with the circle group $\{T\}$ is divided into t portions as illustrated in FIG. 5, and the ciphertext cy is a ciphertext of 0 to $(t/2)-1$.

In the above description, the ciphertext cc has been described as being the binary symbol 1 when the plaintext is $1/t$ and the binary symbol 0 when the plaintext is 0.

A ciphertext cc' with the symbol reversed can be obtained by multiplication of the ciphertext cc by $t/2$ and addition of a trivial ciphertext $(0, \frac{1}{2})$. Obtaining the ciphertext cc' is not necessarily required, although particularly described for explanation. Binary multiplication can also be performed for the ciphertext cc as it is. The ciphertext cc' and the ciphertext cc are synonymous ciphertexts in terms of being able to take two values corresponding to the symbols 0 and 1.

Regarding the ciphertext cc, in a case where the plaintext is $1/t$, when multiplication by $t/2$ is performed and then $(0, \frac{1}{2})$ is added, the plaintext becomes 1 (0) as represented by $(1/t)\times(t/2)\pm\frac{1}{2}=\frac{1}{2}+\frac{1}{2}=1$ (0).

Further, in a case where the plaintext is 0, when multiplication by $t/2$ is performed and then $(0, \frac{1}{2})$ is added, the plaintext cc becomes $\frac{1}{2}$ as represented by $$0\times(t/2)+1/2 = 0+1/2 = 1/2.$$

The ciphertext cc' thus obtained becomes the symbol 1 when the plaintext is 0 and becomes the symbol 0 when the plaintext is $\frac{1}{2}$.

The following description is made by associating the ciphertext cc' with a ciphertext having the integer 0 or the integer $t/2$ as a plaintext, where t is an even number.

The plaintext 0 of the ciphertext cc' obtained as described above is associated with the integer 0, and the plaintext $\frac{1}{2}$ of the ciphertext cc' is associated with the integer $t/2$ described below.

The ciphertext cc is described as the ciphertext cc' that is the binary symbol 1 when the plaintext is the integer 0 and the binary symbol 0 when the plaintext is the integer $t/2$.

Two univariate functions $f_{id}$ and $f_{half}$ are used as elements of Gate Bootstrapping in order to perform multiplication between the integer ciphertext cy and the binary ciphertext cc'.

In order to perform an operation of a univariate function for an encrypted integer, a method can be used which is obtained by expanding Gate Bootstrapping in Chillotti et al., 2020. This method is described in "Bootstrapping in FHEW-like Cryptosystems, Daniele Micciancio and Yuriy Polyakov, Duality Technologies, Feb. 23, 2020". The disclosed method does not set a constant $\mu$ as coefficients of a test vector but sets a function result, thereby obtaining different results depending on the value of a TLWE ciphertext.

The univariate function $f_{id}$ outputs, for the ciphertext cy of the integer 0 to $(t/2)-1$ input thereto, a ciphertext of the same integer 0 to $(t/2)-1$.

In a test vector $T_{id}(X)$ for executing a univariate function $f_{id}$ simultaneously with BlindRotate, $$\begin{cases} \mu_0, \dots, \mu_{\lfloor\frac{n}{t}\rfloor} & := \dfrac{f_{id}(0)}{t} = 0, \\[2mm] \mu_{\lfloor\frac{(2i-1)n}{t}\rfloor+1}, \dots, \mu_{\lfloor\frac{(2i+1)n}{t}\rfloor} & := \dfrac{f_{id}(i)}{t} = \dfrac{i}{t}, \text{ for } i=1, \dots, t/2-1, \\[2mm] \mu_{n-\lfloor\frac{n}{t}\rfloor}, \dots, \mu_{n-1} & := \dfrac{-f_{id}(0)}{t} = 0. \end{cases}$$

are set as coefficients of respective orders from 0-th order to $(n-1)$th order.

A univariate function $f_{half}$ is a function that obtains, for the ciphertext cy of the integer 0 to $(t/2)-1$ input thereto, $cy/2$ when the plaintext integer is an even number and $-(cy+1)/2-((t/2)-1)/2$ otherwise.

In a test vector $T_{half}(X)$ for executing the univariate function $f_{half}$ simultaneously with BlindRotate, $$\begin{cases} \mu_0, \ldots, \mu_{\lfloor \frac{n}{t} \rfloor} & := \dfrac{f_{half}(0)}{t} = 0, \\[2mm] \mu_{\lfloor \frac{(2i-1)n}{t} \rfloor + 1}, \ldots, \mu_{\lfloor \frac{(2i+1)n}{t} \rfloor} & := \dfrac{f_{half}(i)}{t}, \text{ for } i = 1, \ldots, t/2 - 1, \\[2mm] \mu_{n - \lfloor \frac{n}{t} \rfloor}, \ldots, \mu_{n-1} & := \dfrac{-f_{half}(0)}{t} = 0. \end{cases}$$

are set as coefficients of respective orders from 0-th order to (n−1)th order.

First, the encryption processing apparatus 1 performs a homomorphic operation between the TLWE ciphertext cc' that is a binary ciphertext and the TLWE ciphertext cy that is an integer ciphertext.

The encryption processing apparatus 1 performs Gate Bootstrapping on the result of the homomorphic operation as input by using the above test vector polynomial $T_{id}(X)$ to obtain a temporary ciphertext $c_{tmp}$.

When the TLWE ciphertext cc' is a ciphertext of t/2 (symbol 0, corresponding to the plaintext 0 of the ciphertext cc), the result of cc'+cy is a ciphertext of y/t+½, and the plaintext of the TLWE ciphertext cy is rotated to a position symmetrical with respect to the origin (½ is equivalent to half of the circle group). The plaintext of the ciphertext $c_{tmp}$ after Gate Bootstrapping using the test vector polynomial $T_{id}(X)$ is moved to a bilaterally symmetrical position. The ciphertext $c_{tmp}$ is a ciphertext obtained by reversing the sign of the ciphertext cy.

When the TLWE ciphertext cc' is a ciphertext of 0 (symbol 1, corresponding to the plaintext 1/t of the ciphertext cc), the result of cc'+cy is a ciphertext of y/t, and the plaintext of the ciphertext $c_{tmp}$ after Bootstrapping remains the same as a plaintext of the ciphertext cy.

The encryption processing apparatus 1 then performs a homomorphic operation (the ciphertext cy+the ciphertext $c_{tmp}$).

When the TLWE ciphertext cc' is the ciphertext of 0 (symbol 1), the result of the homomorphic operation (the ciphertext cy+the ciphertext $c_{tmp}$) is the ciphertext cy+the ciphertext cy.

When the TLWE ciphertext cc' is the ciphertext of t/2 (symbol 0), the result of the homomorphic operation (the ciphertext cy+the ciphertext $c_{tmp}$) is a ciphertext $c_0$ having 0 as a plaintext.

The encryption processing apparatus 1 performs Gate Bootstrapping on the result of the homomorphic addition as input by using the above test vector polynomial $T_{half}(X)$. As a result of Gate Bootstrapping, (the ciphertext cy+the ciphertext cy) is converted to the ciphertext cy, and the ciphertext $c_0$ remains the ciphertext $c_0$.

When the TLWE ciphertext cc' by which the integer ciphertext cy is multiplied is the ciphertext of 0, the ciphertext cy is obtained by Gate Bootstrapping. When the TLWE ciphertext cc' is the ciphertext of t/2, the ciphertext $c_0$ is obtained.

By performing the above processes, the encryption processing apparatus 1 can perform multiplication between the integer ciphertext cy and the binary ciphertext cc'.

Since a value on a circle group which is used by the ciphertext cc is different as described above, adjustment needs to be performed by multiplying a value obtained by Gate Bootstrapping by 2t. Since 2t is an integer, multiplication is defined on the circle group.

The Integer-wise type TLWE ciphertext to be subjected to division and a remainder operation described with reference to FIG. 6 and division according to the modification described with reference to FIG. 7 may be a ciphertext of a multiple-precision integer (BIG INTEGER). Methods of division and a remainder operation between ciphertexts are the same as those in the descriptions with reference to FIGS. 6 and 7.

However, in a case of division and a remainder operation between the TLWE ciphertext cx (dividend) and the TLWE ciphertext cy (divisor) that are both multiple-precision integers, the encryption processing apparatus 1 needs to perform a multiple-precision operation described below when performing homomorphic subtraction cx−cy to obtain the TLWE ciphertext cd.

The method of multiple-precision operation described below is merely an example and is not limited thereto, and other known methods can also be used.

In one example, the encryption processing apparatus 1 realizes scalar division and a scalar remainder operation for homomorphic encryption and further realizes a multiple-precision operation for homomorphic encryption by using the results of the scalar division and the scalar remainder operation.

In the multiple-precision operation, calculation is performed on one or more operation units obtained by dividing one number. The multiple-precision operation enables a big number to be handled without deteriorating the encryption strength.

To realize the scalar division and the scalar remainder operation, the encryption processing apparatus 1 improves Gate Bootstrapping presented in the aforementioned paper.

The encryption processing apparatus 1 sets a TRLWE ciphertext (the polynomial F(X) as a test vector) input to BlindRotate as a polynomial having coefficients each being the result of a step function or a sawtooth function.

The encryption processing apparatus 1 obtains such a TRLWE ciphertext from a divisor and performs BlindRotate using the thus obtained TRLWE ciphertext, thereby realizing the scalar division and the scalar remainder operation. As the content of the multiple-precision operation and processing such as encryption using the multiple-precision operation, those that are commonly known can be used as they are.

Scalar division or a scalar remainder operation can be performed by the method described below. The scalar division and the scalar remainder operation are operations for respectively obtaining a quotient and a remainder when an Integer-wise ciphertext is divided by a real number that is not a ciphertext. When the scalar division or the scalar remainder operation becomes possible, TFHE can be used as homomorphic encryption that can be subjected to Integer-wise type four arithmetic operations. Such TFHE enables more efficient processing as compared with bit-by-bit calculation by Bit-wise type TFHE.

Further, a multiple-precision operation for homomorphic encryption can be realized by using the result of the scalar division or the scalar remainder operation.

Figure 8:
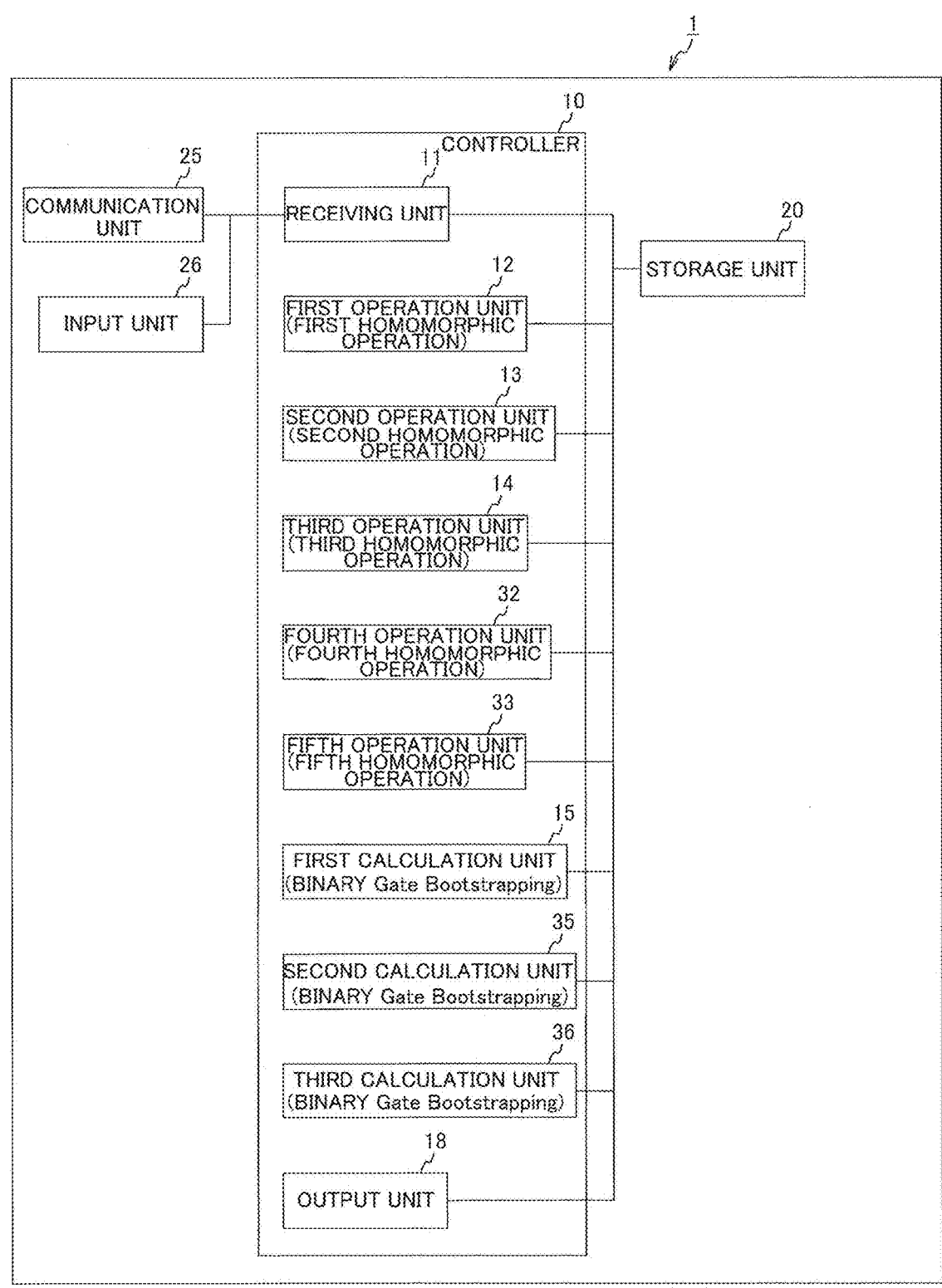
FIG. 8 is an explanatory diagram of a functional configuration of an encryption processing apparatus that performs division and a remainder operation between multiple-precision integers.

FIG. 8 is an explanatory diagram of a functional configuration of an encryption processing apparatus that performs division and a remainder operation between multiple-precision integers.

The configuration in FIG. 8 is a modification of the configuration in FIG. 1. Components same as those in FIG. 1 are denoted by like reference signs, and the descriptions thereof are omitted.

The controller 10 includes, in addition to the configuration in FIG. 1, a fourth operation unit 32, a fifth operation unit 33, a second Bootstrapping unit (calculation unit) 35, and a third Bootstrapping unit (calculation unit) 36.

The fourth operation unit 32 and the fifth operation unit 33 are arithmetic processing units that realize homomorphic operations described below by software.

The second Bootstrapping unit 35 and the third Bootstrapping unit 36 perform Gate Bootstrapping described below on at least one of the operation results output from the fourth operation unit 32 and the fifth operation unit 33 to output a new ciphertext.

At least one of the fourth operation unit 32, the fifth operation unit 33, the second Bootstrapping unit 35, and the third Bootstrapping unit 36 may be realized by hardware.

Figure 9A:
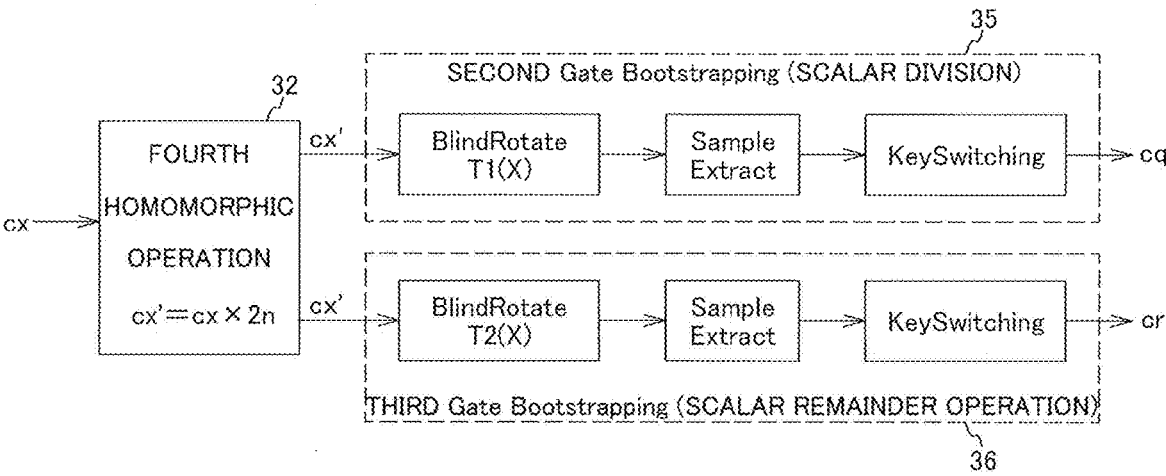
FIGS. 9A and 9B are detailed explanatory diagrams of operation processes based on the functional configuration in FIG. 8.
Figure 9B:
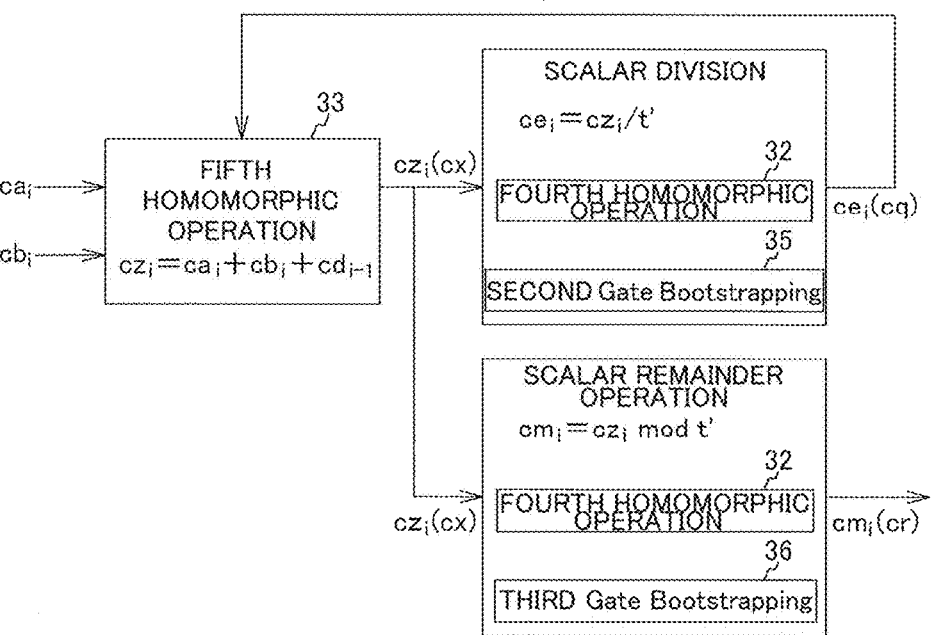

FIGS. 9A and 9B are detailed explanatory diagrams of operation processes based on the functional configuration in FIG. 8.

FIG. 9A illustrates a functional configuration for performing a scalar operation (scalar division and a scalar remainder operation), and FIG. 9B illustrates a functional configuration for performing a multiple-precision operation including the scalar operation.

In FIG. 9A, the fourth operation unit 32 and the second Bootstrapping unit 35 configure a scalar division unit in FIG. 9B and perform scalar division on the result of a fourth homomorphic operation. For example, when a ciphertext cx having an integer x as its plaintext is input, the fourth operation unit 32 performs the fourth homomorphic operation that multiplies the ciphertext cx by 2n to obtain a new ciphertext cx'.

The integer x and its ciphertext cx described here are used as a matter of convenience for the sake of explanation of the scalar division and the scalar remainder operation and are distinguished from an integer that is not a multiple-precision integer and its ciphertext both being able to be subjected to the division and the remainder operation (FIG. 6) and the division according to the modification (FIG. 7).

Multiplying the ciphertext cx by 2n corresponds to multiplying a ciphertext by an integer, and multiplying a ciphertext by an integer is defined on a circle group as described above. Therefore, the ciphertext cx' is obtained by a conventionally known method.

The second Bootstrapping unit 35 to which the ciphertext cx' has been input performs Gate Bootstrapping and at the same time performs scalar division that divides the ciphertext cx' by a predetermined plaintext.

The third Bootstrapping unit 36 to which the ciphertext cx' has been input performs Gate Bootstrapping and at the same time performs a scalar remainder operation that obtains a remainder of division of the ciphertext cx' by the predetermined plaintext.

In FIG. 9A, the fourth operation unit 32 and the second Bootstrapping unit 35 configure the scalar division unit in FIG. 9B and perform scalar division on the result of the fifth homomorphic operation.

Further, in FIG. 9A, the fourth operation unit 32 and the third Bootstrapping unit 36 configure a scalar remainder operation unit in FIG. 9B and perform a scalar remainder operation on the result of the fifth homomorphic operation.

FIG. 9B illustrates a configuration in a case of performing a multiple-precision operation (addition) between ciphertexts by using the scalar division unit and the scalar remainder operation unit in FIG. 9A.

In FIG. 9B, the fifth operation unit 33 performs a fifth homomorphic operation $(ca_i+cb_i+ce_{i-1})$ on the i-th divided portion of each of input ciphertexts ca and cb as operation objects and a quotient ciphertext $ce_{i-1}$ output as the (i–1)th output from the scalar division unit (a carry described in detail later). However, in a case of performing the fifth homomorphic operation for the first time (i=1), $ce_{i-1}$ is a ciphertext having 0 as a plaintext, and only an operation $ca_i+cb_i$ (i=1) is simply performed, as described below.

A ciphertext cz that is the output of the fifth homomorphic operation is input to the scalar division unit and the scalar remainder operation unit, and the quotient ciphertext ce that is the result of the division of the ciphertext cz by a plaintext and a remainder ciphertext $cm_i$ that is the result of the remainder operation are output.

The quotient ciphertext ce is returned to the fifth operation unit 33, and the fifth operation unit 33 performs the fifth homomorphic operation on the (i+1)th portions of the input ciphertexts ca and cb and the quotient ciphertext ce. That is, the next scalar division and the next scalar remainder operation are performed.

The fifth homomorphic operation, the scalar division, and the scalar remainder operation are repeated. A string of ciphertexts cm that are results of the scalar remainder operation after a predetermined number of repetitions in total becomes the result of the multiple-precision operation (addition).

By performing the homomorphic subtraction $ca_i-cb_i-ce_{i-1}$ as the fifth homomorphic operation in place of $ca_i+cb_i+ce_{i-1}$, it is possible to perform a multiple-precision operation (subtraction) between ciphertexts. The string of the ciphertexts cm is the result of the multiple-precision subtraction.

[Scalar Division and Scalar Remainder Operation]

In association with FIG. 9A, methods of scalar division and a scalar remainder operation used for a multiple-precision operation are described in detail.

The encryption processing apparatus 1 sets the number t by which the range from 0 to 1 of the circle group {T} is divided, as described with reference to FIG. 5. In this case, (t/2)–1 becomes the maximum integer that can be recorded in one TLWE ciphertext.

The encryption processing apparatus 1 sets a system parameter in TFHE encryption. Although the procedure is unchanged from that in the aforementioned paper, the degree n of a polynomial in TRLWE encryption (the polynomial F(X) as a test vector) is preferably a multiple of t. Further, the system parameter is set in such a manner that, in a ciphertext obtained after Gate Bootstrapping, the range of an error added to a plaintext is less than ±1/(2t).

It is assumed that there is a TLWE ciphertext cx that is a dividend.

The TLWE ciphertext cx has a real number x/2t corresponding to the integer x (divisor) that cannot be known without a private key, as a plaintext.

The TLWE ciphertext cx is subjected to division or a remainder operation by the real number y. The integer x, the real number y, and the ciphertext cx described here are used for explanation of the scalar division and the scalar remainder operation and are distinguished from an integer that is not a multiple-precision integer and its ciphertext both being able to be subjected to the division and the remainder operation (FIG. 6) and the division according to the modification (FIG. 7).

In order to perform an operation of a univariate function on encrypted two variables, a method can be used which is obtained by extending Gate Bootstrapping in Chillotti et al., 2020. This method is described in "Bootstrapping in FHEW-like Cryptosystems, Danniele Micciancio and Yuriy Polyakov, Duality Technologies, Feb. 23, 2020". The disclosed method does not set a constant μ as coefficients of a test vector but sets a function result, thereby obtaining different results depending on the value of a TLWE ciphertext. This paper proposes to use $$\sum_{i=0}^{n-1} f(i) X^i$$

as a test vector polynomial.

The encryption processing apparatus 1 uses the following test vector polynomials T1(X) and T2(X).

The test vector polynomial T1(X) is for division.

The test vector polynomial T2(X) is for a remainder operation.

$$T1(X) = \sum_{i=0}^{t-1} \frac{\lfloor t/y \rfloor}{2t} \left( \sum_{j=0}^{n/t-1} X^{\frac{n}{t}i+j} \right)$$

$$T2(X) = \sum_{i=0}^{t-1} \frac{t \bmod y}{2t} \left( \sum_{j=0}^{n/t-1} X^{\frac{n}{t}i+j} \right)$$

The term common to the two test vector polynomials $$\sum_{j=0}^{n/t-1} X^{\frac{n}{t}i+j}$$

corresponds to one section obtained by dividing the circle group by t.

To the test vector polynomial T1(X), the method of calculating a univariate function described above is applied. In the test vector polynomial T1(X), the result of a function (t/y) that obtains a result of division of a dividend ciphertext by a plaintext y (divisor) is set as the coefficients.

The encryption processing apparatus 1 performs BlindRotate using the test vector polynomial $T_1(X)$ on the TLWE ciphertext cx and the plaintext y as input of Gate Bootstrapping and further performs SampleExtract and KeySwitching, thereby being able to obtain a TLWE ciphertext having x/y corresponding to a division result (quotient) as its plaintext.

To the test vector polynomial T2(X), the method of calculating a univariate function described above is applied. In the test vector polynomial T2(X), the result of a function (t mod y) that obtains a remainder when the dividend ciphertext is divided by the plaintext y (divisor) is set as the coefficients.

The encryption processing apparatus 1 performs BlindRotate using the test vector polynomial T2(X) on the TLWE ciphertext cx and the plaintext y as input of Gate Bootstrapping and further performs SampleExtract and KeySwitching, thereby being able to obtain a TLWE ciphertext having (t mod y) corresponding to a remainder operation result (remainder) as its plaintext.

First, the encryption processing apparatus 1 creates trivial ciphertexts (0, T1(X)) and (0, T2(X)) respectively having the above test vector polynomials T1(X) and T2(X) as a plaintexts.

The encryption processing apparatus 1 (the fourth operation unit 32) multiplies each coefficient of the TLWE ciphertext cx by 2n and rounds the result, to obtain the TLWE ciphertext cx'. The TLWE ciphertext cx' has $$x \frac{n}{t} + \frac{n}{2t} \pm \frac{n}{2t}$$

as a plaintext.

The encryption processing apparatus 1 (the second Gate Bootstrapping unit 35) performs BlindRotate using the test vector polynomial T1(X) on the TLWE ciphertext cx' as input. The coefficient of a constant term of a plaintext polynomial obtained as a result of BlindRotate is $$\frac{\lfloor x/y \rfloor}{2t} + \varepsilon,$$

where ε is an error generated by BlindRotate.

Further, the encryption processing apparatus 1 (the third Gate Bootstrapping unit 36) performs BlindRotate using the test vector polynomial T2(X) on the TLWE ciphertext cx' as input.

The coefficient of a constant term of a plaintext polynomial obtained as a result of BlindRotate is $$\frac{s \bmod y}{2t} + \varepsilon,$$

where ε is an error generated by BlindRotate.

The encryption processing apparatus 1 performs Sample-Extract and KeySwitching on a TRLWE ciphertext obtained by each BlindRotate in an identical manner to that in normal Gate Bootstrapping. Consequently, the encryption processing apparatus 1 obtains a TLWE ciphertext cq corresponding to a division result (quotient) and a TLWE ciphertext cr corresponding to a remainder operation result (remainder).

The TLWE ciphertext cq has, as its plaintext, $$\frac{\lfloor x/y \rfloor}{2t} + \varepsilon$$

corresponding to the coefficient of a constant term of a plaintext polynomial obtained as a result of BlindRotate using the test vector polynomial T1(X).

The TLWE ciphertext cq has, as its plaintext, $$\frac{s \bmod y}{2t} + \varepsilon$$

corresponding to the coefficient of a constant term of a plaintext polynomial obtained as a result of BlindRotate using the test vector polynomial T2(X).

[Multiple-Precision Operation]

The encryption processing apparatus 1 performs a multiple-precision operation on a big plaintext number (multiple-precision integer BIG INTEGER) by using the scalar division and the scalar remainder operation described above.

In the following description, the ciphertext of a multiple-precision plaintext X and the ciphertext of a multiple-precision plaintext Y may be described as the ciphertext cx and the ciphertext cy, respectively.

In FIGS. 6 and 7, ciphertexts of integers that are not multiple-precision integers and are subjected to division and a remainder operation have been described as cx and cy. In the following description, the ciphertexts of the multiple-precision integers X and Y are described as the ciphertexts cx and cy that are the same as those in FIGS. 6 and 7 in order to apply the division and the remainder operation in FIG. 6 and the division in FIG. 7 to multiple-precision integers.

The multiple-precision operation performed by the encryption processing apparatus 1 is described in association with FIG. 9B.

The encryption processing apparatus 1 sets t (the division number of the circle group described in FIG. 5) that is small enough to maintain a sufficient level of encryption strength to satisfy $(t/2)-1 \geq 2t'-1$ by using an appropriate natural number t'.

In a case where t' is a power of 2, conversion with plaintext is easy to compute by a computer. However, t' may be another number.

The encryption processing apparatus 1 also determines an appropriate natural number u as the number of multiple-precision fields (bit units in division of a multiple-precision integer, sections), where μ is the number of TLWE ciphertexts dividing one plaintext (the multiple-precision integer).

The multiple-precision integer is divided into u fields or for each of fields $t'^0$, $t'^1$, $t'^2$, ... $t'^{u-1}$.

The encryption processing apparatus 1 divides a plaintext X into u $X_i$'s in the form of $$X = \sum_{i=0}^{u-1} X_i t'^i.$$

The encryption processing apparatus 1 encrypts each $X_i$ to create u TLWE ciphertexts $ca_i$ ($0 \leq i \leq u-1$).

A ciphertext $ca_0$ is a ciphertext for the field $t'^0$ obtained by dividing the multiple-precision integer, a ciphertext $ca_1$ is a ciphertext for the field $t'^1$ obtained by dividing the multiple-precision integer, a ciphertext $ca_2$ is a ciphertext for the field $t'^2$ obtained by dividing the multiple-precision integer, and a ciphertext $ca_{u-1}$ is a ciphertext for the field $t'^{u-1}$ obtained by dividing the multiple-precision integer.

By computing $X_i$ obtained by decrypting $ca_i$ by using the above expression, the original plaintext X can be obtained.

The encryption processing apparatus 1 divides the other plaintext Y into u $Y_i$'s in the form of $$Y = \sum_{i=0}^{u-1} Y_i t'^i,$$

as with the plaintext X. The encryption processing apparatus 1 encrypts each $Y_i$ to create u TLWE ciphertexts $cb_i$ ($0 \leq i \leq u-1$).

As with the case of X, a ciphertext $cb_0$ is a ciphertext for the field $t'^0$ obtained by dividing the multiple-precision integer, a ciphertext $cb_1$ is a ciphertext for the field $t'^1$ obtained by dividing the multiple-precision integer, a ciphertext $cb_2$ is a ciphertext for the field $t'^2$ obtained by dividing the multiple-precision integer, and a ciphertext $cb_{u-1}$ is a ciphertext for the field $t'^{u-1}$ obtained by dividing the multiple-precision integer.

By dividing the multiple-precision integers X and Y and then performing encryption, plaintext values that the TLWE ciphertexts $ca_i$ and the TLWE ciphertexts $cb_1$ can take, respectively, can be made small, so that the division number of the circle group can be made small. The encryption processing apparatus 1 can thus perform multiple-precision four arithmetic operations with the ciphertext security maintained.

Although multiple-precision subtraction between ciphertexts involved in cx−cy is particularly related to the division and the remainder operation in the present embodiment, the description is provided here as to multiple-precision addition between ciphertexts which corresponds to an operation (X+Y) of obtaining the sum of the multiple-precision integers X and Y.

The encryption processing apparatus 1 performs the multiple-precision operation between the ciphertexts cx and cy which corresponds to (the plaintext X+the plaintext Y) in the following procedure.

As an initialization process, i is set to 0.

(1) Set $ce_{i-1}$ as a TLWE ciphertext having 0 as a plaintext.

(2) Perform addition (homomorphic addition) of $ca_i$, $cb_i$, and $ce_{i-1}$ while keeping them encrypted, to obtain $cz_i$. In FIG. 9A, the ciphertext $cz_i$ corresponds to the ciphertext cx.

(3) Obtain the ciphertext $ce_i$ and the ciphertext $cm_i$ that are respectively a quotient and a remainder when $cz_i$ is subjected to scalar division and a scalar remainder operation by t' (a scalar division unit and a scalar remainder operation unit). In FIG. 9A, the ciphertexts $ce_i$ and $cm_i$ correspond to the ciphertexts cq and cr, respectively.

The quotient ciphertext $ce_i$ obtained by scalar division on the result of homomorphic addition for $t'^i$ is a carry to $t'^{i+1}$ by the operation for $t'^i$. In a homomorphic operation between $ca_{i+1}$ and $cb_{i+1}$ for $t'^{i+1}$, the ciphertext $ce_i$ is also added.

The encryption processing apparatus 1 increments i by 1 and repeats the processes from (1) to (3) u times. A string of $cm_i$'s after the processes are repeated u times becomes a multiple-precision ciphertext cm corresponding to the plaintext X+the plaintext Y.

Based on the above descriptions, addition between ciphertexts of the plaintext X and the plaintext Y is described specifically.

Creating the u TLWE ciphertexts $ca_i$ by dividing the plaintext X into u $X_i$'s for the respective fields $t'^i$ and performing encryption and creating the u TLWE ciphertexts $cb_i$ by dividing the plaintext Y into u $Y_i$'s for the respective fields $t'^i$ and performing encryption are performed as described above.

For simplification of the descriptions, it is assumed that ciphertexts for the fields $t'^0$ and $t'^1$ obtained by dividing the plaintext X are a and b, respectively, and ciphertexts for the fields $t'^0$ and $t'^1$ obtained by dividing the plaintext Y are c and d, respectively.

The encryption processing apparatus 1 performs an operation of b+d between the ciphertexts for the field $t'^0$ of the plaintexts X and Y.

First, the encryption processing apparatus 1 performs scalar division by a scalar division unit and a scalar remainder operation by a scalar remainder operation unit on the result of the operation b+d.

The remainder obtained as a result of the scalar remainder operation is a value of $t'^0$ for a section (or at a digit) of a ciphertext as an addition result.

Meanwhile, the quotient obtained as a result of the scalar division is carried to $t'^1$.

The encryption processing apparatus 1 performs scalar division and a scalar remainder operation on the result of an operation of a+c+carry.

The remainder obtained as a result of the scalar remainder operation is a value of $t''^1$ for a section (or at a digit) of a ciphertext as the addition result.

Meanwhile, the quotient obtained as a result of the scalar division is carried to $t'^2$.

When there are more $t'^i$, scalar division and a scalar remainder operation are repeated on the result of addition between the sum of ciphertexts for the field $t'^2$ and the carry.

By adding all values respectively corresponding to $t^{i0}$, $t^{i1}$, ... with carries included, values for respective sections can be obtained. The encryption processing apparatus 1 can thus perform a multiple-precision operation.

A multiple-precision operation between ciphertexts which corresponds to the plaintext X–the plaintext Y can also be computed by performing homomorphic subtraction ($ca_i-cb_i-cd_{i-1}$) in place of the homomorphic addition in (2).

In this case, the quotient ciphertext cdi obtained by scalar division on the result of homomorphic subtraction for $t^{i}$ is a borrow from $t^{i+1}$ by the operation for $t^{i}$. In a homomorphic operation between $ca_{i+i}$ and $cb_{i+1}$ for $t^{i+1}$, the ciphertext cdi is also subtracted.

The string of ciphertext $cm_i$ that is the result of multiple-precision operation corresponds to the ciphertext cd that is the result of homomorphic subtraction cx–cy between ciphertexts described with reference to FIGS. 6 and 7. The ciphertext cd is also a ciphertext of a multiple-precision integer.

In the process of obtaining the subtraction result cd, $ce_i$ is a borrow. Therefore, $ce_{u-1}$ calculated at the end is equal to a borrow when subtraction is performed for a whole multiple-precision integer. In other words, the result of calculation of cx–cy becomes negative, that is, in a case of cx<cy, $ce_{u-1}$ becomes a ciphertext of 1. On the other hand, in a case where cx≥cy, $ce_{u-1}$ becomes a ciphertext of 0. The ciphertext cc is thus obtained.

Further, binary multiplication cy×cc can be performed in an identical manner to that in FIG. 2 (FIG. 6), where cy is each of ciphertexts obtained by decomposition of the multiple-precision plaintext Y. Binary multiplication cy×cc can be performed by performing a binary operation using the binary ciphertext cc for each of fields of cy that is the ciphertext of a multiple-precision integer.

A multiple-precision integer of homomorphic encryption can be handled in an identical manner to a general integer. Further, by increasing the number u of TLWE ciphertexts, a plaintext value that one TLWE ciphertext can have is made small, and the division number t of a circle group is made small, but it is not necessary to make a plaintext value that can be handled in an overall operation small. Therefore, the present embodiment can handle a big number without sacrificing the encryption strength.

FIG. 10 is a flowchart illustrating a flow of a scalar division process performed by an encryption processing apparatus.

At Step S201, the encryption processing apparatus 1 (the fourth operation unit 32) multiplies each coefficient of the ciphertext cx of the dividend x by 2n to obtain the ciphertext cx'.

The encryption processing apparatus 1 (the second Bootstrapping unit 35) performs division by performing Gate Bootstrapping on the ciphertext cx' as input.

At Step S202, the encryption processing apparatus 1 performs BlindRotate using the ciphertext cx' and the test vector polynomial T1(X).

At Step S203, the encryption processing apparatus 1 performs SampleExtract.

At Step S204, the encryption processing apparatus 1 performs KeySwitching and outputs an obtained ciphertext as a division result.

FIG. 11 is a flowchart illustrating a flow of a scalar remainder operation process performed by an encryption processing apparatus.

At Step S211, the encryption processing apparatus 1 (the fourth operation unit 32) multiplies each coefficient of the ciphertext cx of the dividend x by 2n to obtain the ciphertext cx'.

The encryption processing apparatus 1 (the third Bootstrapping unit 36) performs a remainder operation by performing Gate Bootstrapping on the ciphertext cx' as input.

At Step S212, the encryption processing apparatus 1 performs BlindRotate using the ciphertext cx' and the test vector polynomial T2(X).

At Step S213, the encryption processing apparatus 1 performs SampleExtract.

At Step S214, the encryption processing apparatus 1 performs KeySwitching and outputs an obtained ciphertext as a remainder operation result.

Figure 12:
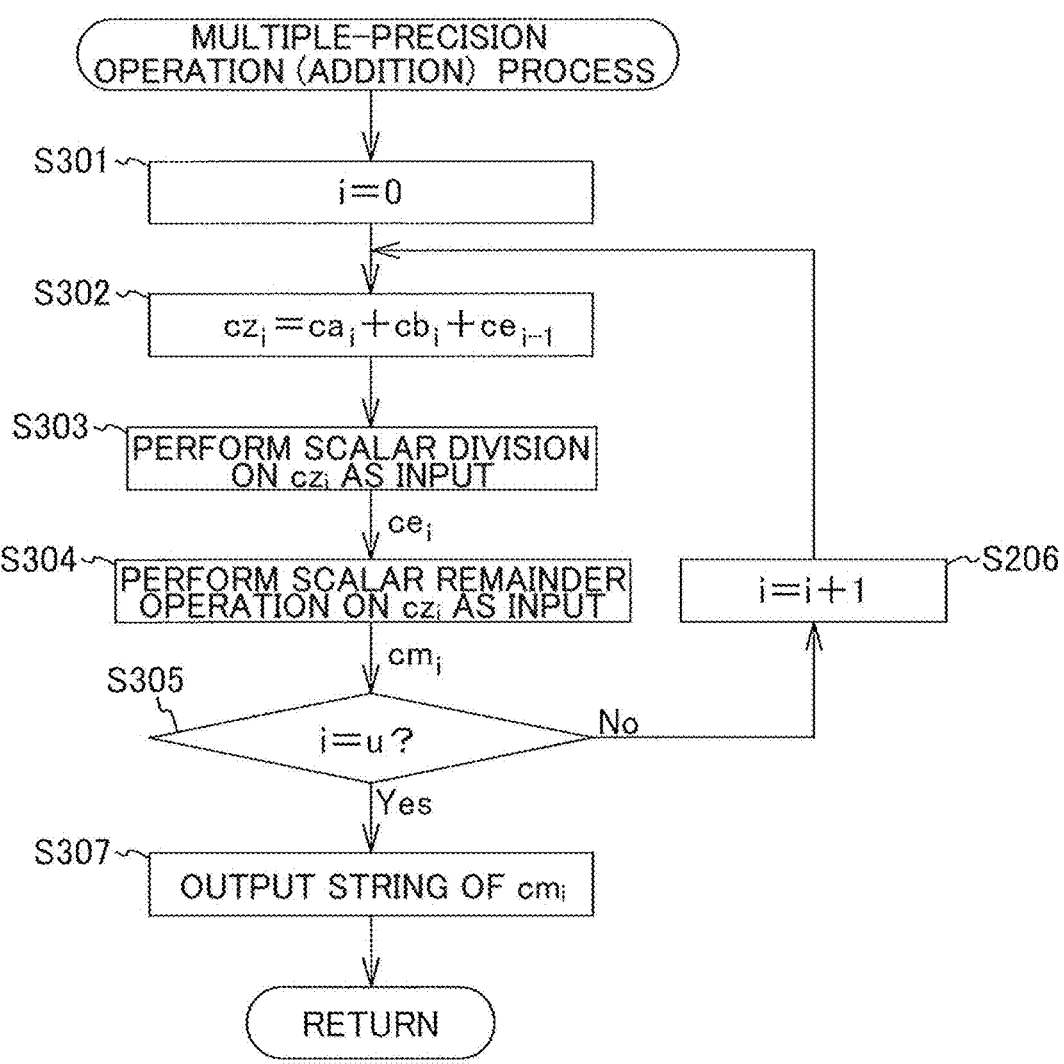
FIG. 12 is a flowchart illustrating a flow of a multiple-precision operation process performed by the encryption processing apparatus.

FIG. 12 is a flowchart illustrating a flow of a multiple-precision operation process performed by an encryption processing apparatus.

At Step S301, the encryption processing apparatus 1 (the fourth operation unit 32) substitutes 0 into the variable i as an initialization process.

At Step S302, the encryption processing apparatus 1 (the fourth operation unit 32) adds $ca_i$, $cb_i$, and $ce_{i-1}$ together in a homomorphic manner to obtain $cz_i$.

At Step S303, the encryption processing apparatus 1 (the fourth operation unit 32 and the second Bootstrapping unit 35) performs scalar division on $cz_i$ as input by using the method described in FIG. 8 to obtain the ciphertext $ce_i$.

At Step S304, the encryption processing apparatus 1 (the fourth operation unit 32 and the third Bootstrapping unit 36) performs a scalar remainder operation on $cz_i$ as input by using the method described in FIGS. 9A and 9B to obtain the ciphertext $cm_i$.

At Step S305, the encryption processing apparatus 1 determines whether i has reached u.

When determining that i has not reached u (No at Step S305), the encryption processing apparatus 1 increments the value of i by 1 at Step S306 and repeats the processes from Step S302 to S304.

When determining that i has reached u (Yes at Step S305), the encryption processing apparatus 1 outputs a string of cm obtained up to this point as the result of the multiple-precision operation. With the processes described above, a multiple-precision operation (addition) between Integer-wise type TLWE ciphertexts can be performed.

A multiple-precision operation between ciphertexts which corresponds to (the plaintext X–the plaintext Y) can also be calculated by performing homomorphic subtraction ($ca_i-cb_i-ce_{i-1}$) at Step S302.

Figures 13A, 13B:
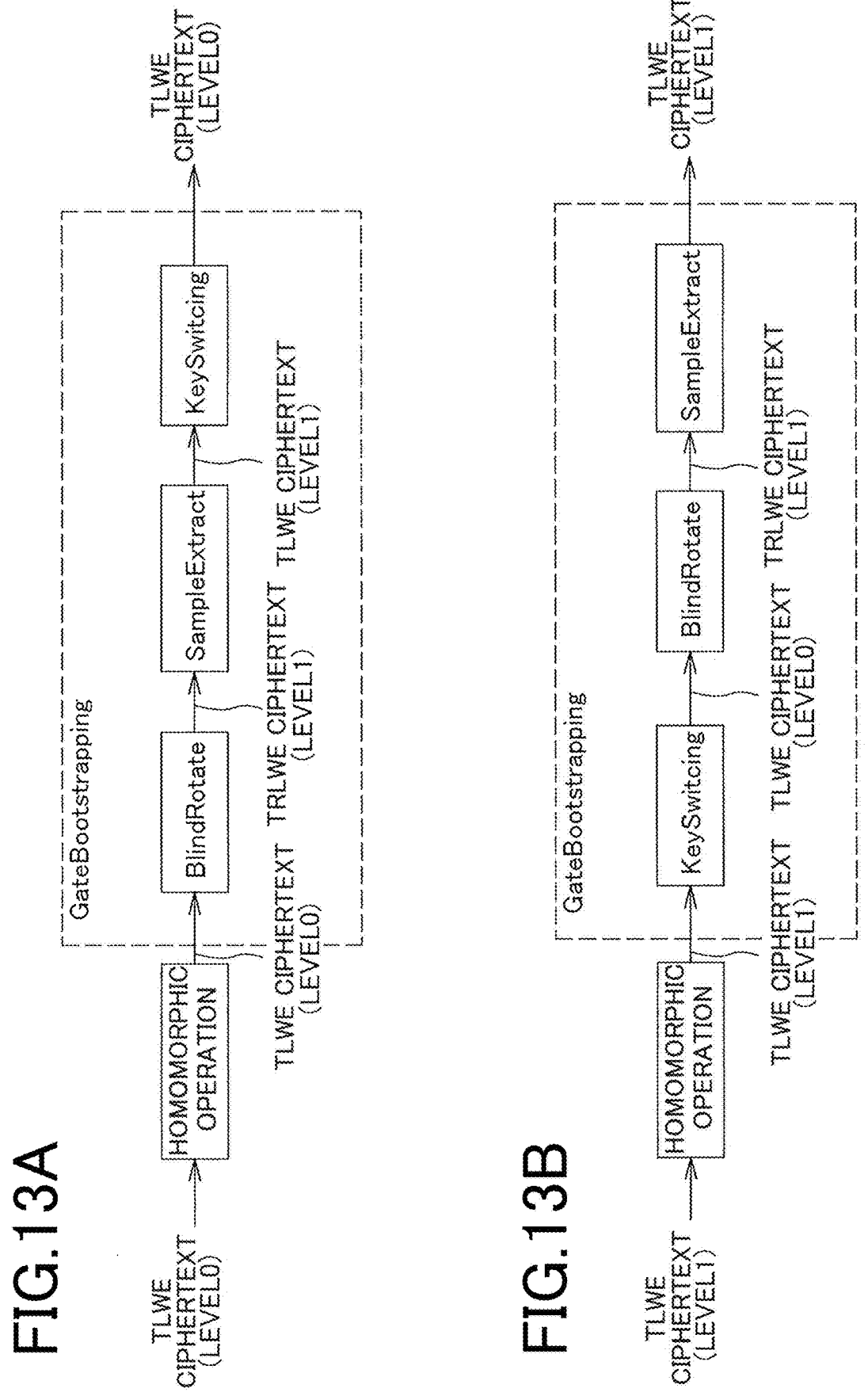
FIGS. 13A and 13B are diagrams illustrating ciphertexts input to and output from Gate Bootstrapping in the present embodiment.

FIGS. 13A and 13B are diagrams illustrating ciphertexts input to and output from Gate Bootstrapping in the present embodiment.

In the above description, Gate Bootstrapping has been described as being performed in the order of BlindRotate, SampleExtract, and KeySwitching as illustrated in FIG. 13A.

The order is not limited thereto. First, KeySwitching can be performed in Gate Bootstrapping, as illustrated in FIG. 13B, and thereafter BlindRotate and SampleExtract can be performed.

There are concepts of levels for TLWE ciphertexts in accordance with the security strength.

In Gate Bootstrapping in FIG. 13A, TLWE ciphertexts as input and output are at LEVEL0. BlindRotate is performed for the LEVEL0 TLWE ciphertext, and a TLWE ciphertext obtained by SampleExtract for a TRLWE ciphertext that is the output of BlindRotate becomes a LEVEL1 ciphertext. However, as a result of KeySwitching, the LEVEL0 TLWE ciphertext is output.

Meanwhile, in the method illustrated in FIG. 13B, TLWE ciphertexts input to and output from Gate Bootstrapping are set at LEVEL1, and the level of the input ciphertext is lowered to LEVEL0 by KeySwitching first. BlindRotate is then performed, and SampleExtract is performed for a TRLWE ciphertext that is the output of BlindRotate. Consequently, the LEVEL1 TLWE ciphertext is output.

The LEVEL0 ciphertext is formed by an N-th order vector [a] of elements on the circle group $\{T\}$ encrypted with an N-th order private key [s]. Meanwhile, the LEVEL1 ciphertext obtained as a result of SampleExtract is formed by an n-th order vector [a'] of elements on the circle group $\{T\}$ encrypted with an n-th order private key [s'].

Since the LEVEL0 ciphertext is less than the LEVEL1 ciphertext in the number of coefficients that determine the difficulty of the LWE problem (the order of the vector), the amount of computation of homomorphic addition is less than that at LEVEL1.

Meanwhile, the LEVEL0 ciphertext has a problem that its security strength tends to be lowered when an acceptable error added to the plaintext is made smaller. This is because in LWE encryption, the safety is guaranteed by the error added to the plaintext.

As for TLWE encryption, as the error added the plaintext becomes larger and the number of the coefficients (the order of the vector) is larger, computation (decryption) is more difficult.

In other words, as for TLWE encryption, as the error added to the plaintext is smaller and the number of coefficients (the order of the vector) is smaller, computation (decryption) is easier.

In particular, in TFHE applied to the Integer-wise type, it is necessary to divide the range from 0 to 1 of the circle group $\{T\}$ more finely as the value of the plaintext (integer) stored in a TLWE ciphertext becomes larger. Thus, an error needs to be made smaller also because of a problem of an error in decryption which will be described later. In this case, the security strength tends to decrease, as described above. Therefore, in order to make the error smaller, it is necessary to ensure the security by increasing the number of coefficients (the order of the vector) in the ciphertext.

In order to ensure the security of the ciphertext that is easy to calculate (decipher) by reducing the error added to the plaintext, it is desirable to move KeySwitching to the beginning of Gate Bootstrapping and to use the LEVEL1 ciphertexts, having a large number of coefficients (the order of the vector) and is easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by KeySwitching as input.

Further, making an error to be added to a plaintext smaller has a problem of an error in decryption in addition to the above-described problem of security strength.

As described above, in TFHE applied to Integer-wise type, the range from 0 to 1 associated with the circle group $\{T\}$ is divided into t. When the value of t is made larger and the circle group is more finely divided, the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in the normal distribution, and it is not possible to strictly set an "error range".

In principle, it is only possible to concentrate more errors in a specified range, although there is no change in the concentration around 0.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or a apparatus to which the present embodiment is applied.

Application Example

The processing performed by the encryption processing apparatus 1 can be applied as follows.

For example, there is considered a case in which it is desired to aggregate, from a database in which fields and/or records are encrypted by TLWE encryption, records each having a specific field within a certain range (for example, a case in which it is desired to obtain an average annual income of 30 to 39 years old).

In this case, the encryption processing apparatus 1 is a database sever that manages the encrypted database, receives a query encrypted by TLWE encryption from a terminal apparatus connected thereto via a network or the like, and returns a response to the query which is encrypted by TLWE encryption to the terminal apparatus.

Since an index cannot be created in the encrypted database, it is necessary to perform comparison and aggregation for the entire database.

The encryption processing apparatus 1 performs a comparison operation that compares all records in the encrypted database with the query by using the functions of the first operation unit 12, the second operation unit 13, the third operation unit 14, and the first Bootstrapping unit 15, and in a case of a multiple-precision integer, further using the functions of the fourth operation unit 32, the fifth operation unit 33, the second Bootstrapping unit 35, and the third Bootstrapping unit 36.

The comparison operation is to perform subtraction between a ciphertext of a record and a ciphertext of a query, and the sign of the subtraction result is equivalent to the comparison operation.

The encryption processing apparatus 1 can further perform an aggregate operation for records that match the query in the comparison operation.

In the aggregate operation, the encryption processing apparatus 1 adds the records that match the query in the comparison operation to calculate a total, and further obtains an average value by using division.

As described above, in processing of a query with respect to an encrypted database, it is necessary to perform four arithmetic operations such as addition, subtraction, multiplication, and division, and comparison (comparison is equivalent to positive or negative of a subtraction result) between integers constituting ciphertexts. In addition, it is considered that a full adder operation is frequently used when Bit-wise ciphertexts are used. If the bit length of an integer to be handled becomes large, the number of required full adders also increases. The four arithmetic operations are homomorphic four arithmetic operations with respect to encrypted numerical values that are regarded as ciphertexts of respective bits when a permutation using an input ciphertext is expressed in binary.

The encryption processing apparatus 1 of the present embodiment performs four arithmetic operations and comparison between Integer-wise ciphertexts each having an integer as its plaintext, instead of performing four arithmetic operations on a bit-by-bit basis on Bit-wise ciphertexts by using a full adder. An execution time for query can thus be reduced largely.

The four arithmetic operations and comparison between integers are used not only for aggregation in the database described above, but also in various data processing using ciphertexts frequently.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match.

In fuzzy authentication and fuzzy search, the encrypted database and the query are compared with each other, as in the comparison operation and the aggregate operation in the encrypted database described above. At this time, it is necessary to perform the comparison operation using the data encrypted by homomorphic encryption.

In addition, the Euclidean distance is often used for comparison in fuzzy authentication and fuzzy search. When the Euclidean distance is calculated, calculation of a square is required. Therefore, in Bit-wise type homomorphic encryption, $O(N^2)$ full adders must be caused to operate with respect to the bit length of data when multiplication is performed. Even in a comparison operation by simple subtraction, it is necessary to operate $O(N)$ full adders.

The encryption processing apparatus 1 of the present embodiment performs four arithmetic operations and comparison between Integer-wise ciphertexts each having an integer as its plaintext, instead of performing four arithmetic operations on a bit-by-bit basis on Bit-wise ciphertexts by using a full adder. A processing time required for fuzzy authentication or fuzzy search can thus be reduced largely.

Figure 14:
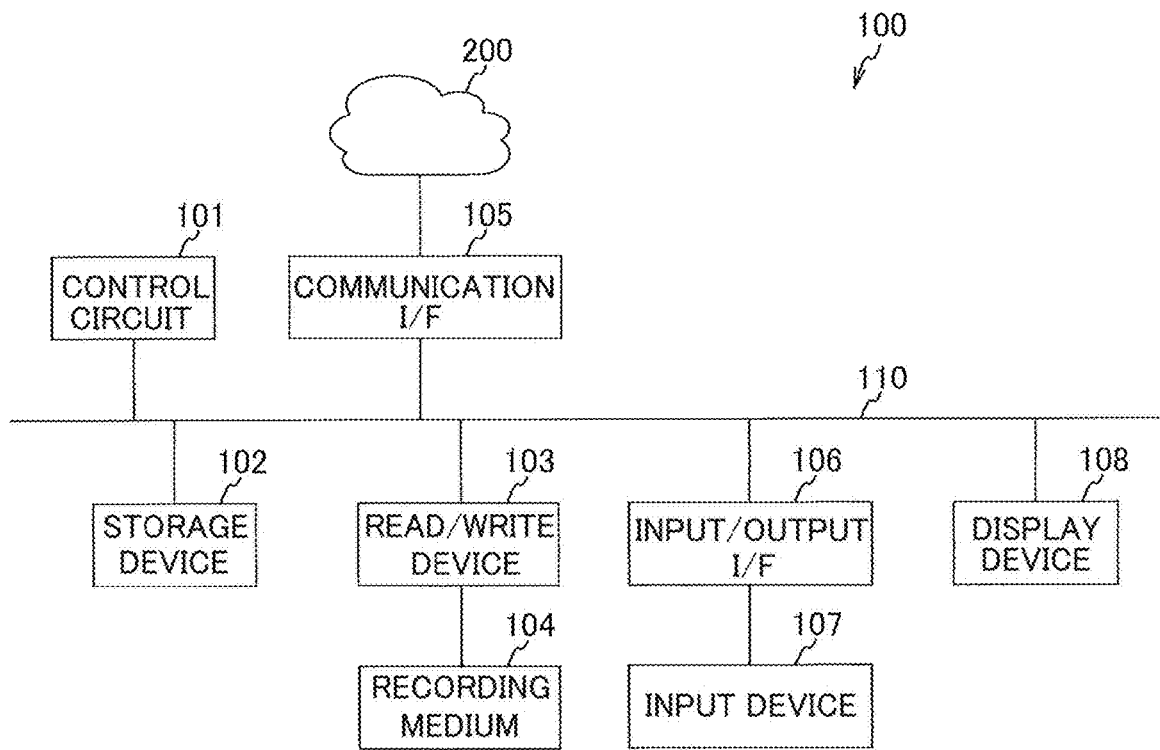
FIG. 14 is a block diagram illustrating an example of a computer apparatus.

FIG. 14 is a block diagram illustrating an example of a computer apparatus.

A configuration of a computer apparatus 100 is described with reference to FIG. 14.

The computer apparatus 100 is, for example, an encryption processing apparatus that processes various types of information. The computer apparatus 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing apparatus 1 can be configured by selecting a part of or all elements from the constituent elements incorporated in the computer apparatus 100 as appropriate.

The control circuit 101 controls the entire computer apparatus 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 2, for example.

The storage device 102 stores therein various types of data. For example, the storage device 102 is a memory such as a Read Only Memory (ROM) and a Random Access Memory (RAM), or a non-transitory computer-readable recording medium such as a Hard Disk (HD) and a Solid State Drive (SSD). The storage device 102 may store therein an information processing program that causes the control circuit 101 to function as the controller 10 in FIG. 2. The storage device 102 functions as the storage unit 20 in FIG. 2, for example. The information processing program is a program for making a processor perform a process of encrypting a ciphertext, for example.

The encryption processing apparatus 1 loads a program stored in the storage device 102 into a RAM when performing information processing.

The encryption processing apparatus 1 executes the program loaded to the RAM by the control circuit 101, thereby performing processing that includes at least one of a receiving process, the first operation process, the second operation process, the third operation process, the fourth operation process, the fifth operation process, the first Bootstrapping process, the second Bootstrapping process, the third Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-transitory computer-readable recording medium such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer apparatus 100 and other apparatuses to one another via the network 200 in a communicable manner. The communication interface 105 functions as the communication unit 25 in FIG. 2, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer apparatus 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 2, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer apparatus 100 to other apparatuses.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing apparatus that processes a ciphertext,
the ciphertext being a fully homomorphic ciphertext that has, as a plaintext associated with an integer, a value obtained by adding an error with a predetermined variance to a predetermined value and that is subjected to a predetermined operation between integers without being decrypted,
the apparatus comprising a processor that performs a process including
obtaining, based on a subtraction result of homomorphic subtraction of a second ciphertext as a divisor from a first ciphertext as a dividend, a binary third ciphertext determining whether the subtraction result is positive or negative, performing an operation process that subtracts a result of homomorphic multiplication between the third ciphertext and the second ciphertext from the first ciphertext in a homomorphic manner to obtain a new ciphertext,
obtaining a new third ciphertext by using an operation result of the operation process as a new first ciphertext, and repeating the operation process by using the new first ciphertext, the second ciphertext, and the new third ciphertext, and
outputting the new ciphertext obtained after a predetermined number of repetitions of the operation process in total, as a result of a remainder operation of the first ciphertext by the second ciphertext.

2. The encryption processing apparatus according to claim 1, wherein the predetermined number is a maximum integer that the ciphertext is able to take.

3. The encryption processing apparatus according to claim 1, wherein the processor performs a homomorphic operation involved in a predetermined operation on a ciphertext,
applies a predetermined polynomial to a ciphertext to obtain a new ciphertext, and
performs a process of reducing number of coefficients in a ciphertext, prior to obtaining a new ciphertext by applying a predetermined polynomial to a result of the homomorphic operation.

4. The encryption processing apparatus according to claim 1, wherein
the first ciphertext has ciphertexts obtained by encrypting respective results obtained by dividing each section of the first integer into a predetermined number of portions,
the second ciphertext has ciphertexts obtained by encrypting respective results obtained by dividing each section of the second integer into a predetermined number of portions, and
the processor performs a multiple-precision operation by performing a homomorphic operation between corresponding ciphertexts in the first ciphertext and the second ciphertext when performing the predetermined operation.

5. The encryption processing apparatus according to claim 1, wherein the processor performs a process involved in fuzzy authentication or fuzzy search using the ciphertext input thereto by performing the predetermined operation.

6. The encryption processing apparatus according to claim 1, wherein the processor performs the predetermined operation to process a query based on the ciphertext input thereto to an encrypted database.

7. An encryption processing apparatus that processes a ciphertext,
the ciphertext being a fully homomorphic ciphertext that has, as a plaintext associated with an integer, a value obtained by adding an error with a predetermined variance to a predetermined value and that is subjected to a predetermined operation between integers without being decrypted,
the apparatus comprising a processor that performs a process including
obtaining, based on a subtraction result of homomorphic subtraction of a second ciphertext as a divisor from a first ciphertext as a dividend, a binary third ciphertext determining whether the subtraction result is positive or negative,
performing an operation process that subtracts a result of homomorphic multiplication between the third ciphertext and the second ciphertext from the first ciphertext in a homomorphic manner to obtain a new ciphertext, obtaining a new third ciphertext by using an operation result of the operation process as a new first ciphertext, and repeating the operation process using the new first ciphertext, the second ciphertext, and the new third ciphertext, accumulating the third ciphertext to a predetermined initial value to obtain a new ciphertext, every time the third ciphertext is obtained, and outputting the new ciphertext obtained by accumulation of the third ciphertext at a time at which the operation process has been repeated a predetermined number of times in total, as a result of division of the first ciphertext by the second ciphertext.

8. The encryption processing apparatus according to claim 7, wherein the predetermined number is in order of log n.

9. The encryption processing apparatus according to claim 7, wherein the predetermined number is a maximum integer that the ciphertext is able to take.

10. The encryption processing apparatus according to claim 7, wherein the processor performs a homomorphic operation involved in a predetermined operation on a ciphertext, applies a predetermined polynomial to a ciphertext to obtain a new ciphertext, and performs a process of reducing number of coefficients in a ciphertext, prior to obtaining a new ciphertext by applying a predetermined polynomial to a result of the homomorphic operation.

11. The encryption processing apparatus according to claim 7, wherein the first ciphertext has ciphertexts obtained by encrypting respective results obtained by dividing each section of the first integer into a predetermined number of portions, the second ciphertext has ciphertexts obtained by encrypting respective results obtained by dividing each section of the second integer into a predetermined number of portions, and the processor performs a multiple-precision operation by performing a homomorphic operation between corresponding ciphertexts in the first ciphertext and the second ciphertext when performing the predetermined operation.

12. The encryption processing apparatus according to claim 7, wherein the processor performs a process involved in fuzzy authentication or fuzzy search using the ciphertext input thereto by performing the predetermined operation.

13. The encryption processing apparatus according to claim 7, wherein the processor performs the predetermined operation to process a query based on the ciphertext input thereto to an encrypted database.

14. A non-transitory computer-readable recording medium storing a program for causing a processor to perform an encryption processing method of processing a ciphertext, the ciphertext being a fully homomorphic ciphertext that has, as a plaintext associated with an integer, a value obtained by adding an error with a predetermined variance to a predetermined value and that is subjected to a predetermined operation between integers without being decrypted, wherein the encryption process includes obtaining, based on a subtraction result of homomorphic subtraction of a second ciphertext as a divisor from a first ciphertext as a dividend, a binary third ciphertext determining whether the subtraction result is positive or negative, performing an operation process that subtracts a result of homomorphic multiplication between the third ciphertext and the second ciphertext from the first ciphertext in a homomorphic manner to obtain a new ciphertext, obtaining a new third ciphertext by using an operation result of the operation process as a new first ciphertext, and repeating the operation process using the new first ciphertext, the second ciphertext, and the new third ciphertext, and outputting the new ciphertext output after a predetermined number of repetitions of the operation process in total, as a result of division or a remainder operation of the first ciphertext by the second ciphertext.

15. A non-transitory computer-readable recording medium storing a program for causing a processor to perform an encryption processing method of processing a ciphertext, the ciphertext being a fully homomorphic ciphertext that has, as a plaintext associated with an integer, a value obtained by adding an error with a predetermined variance to a predetermined value and that is subjected to a predetermined operation between integers without being decrypted, wherein the encryption process includes obtaining, based on a subtraction result of homomorphic subtraction of a second ciphertext as a divisor from a first ciphertext as a dividend, a binary third ciphertext determining whether the subtraction result is positive or negative, performing an operation process that subtracts a result of homomorphic multiplication between the third ciphertext and the second ciphertext from the first ciphertext in a homomorphic manner to obtain a new ciphertext, obtaining a new third ciphertext by using an operation result of the operation process as a new first ciphertext, and repeating the operation process using the new first ciphertext, the second ciphertext, and the new third ciphertext, accumulating the third ciphertext to a predetermined initial value to obtain a new ciphertext, every time the third ciphertext is obtained, and outputting the new ciphertext obtained by accumulation of the third ciphertext at a time at which the operation process has been repeated a predetermined number of times in total, as a result of division of the first ciphertext by the second ciphertext.

* * * * *